United States Patent
Okabe et al.

(10) Patent No.: US 9,319,170 B2
(45) Date of Patent: Apr. 19, 2016

(54) OPTICAL FREQUENCY DIVISION MULTIPLEXER AND POLARIZATION CONTROL METHOD

(71) Applicant: FUJITSU LIMITED, Kawasaki-shi, Kanagawa (JP)

(72) Inventors: Ryou Okabe, Shinagawa (JP); Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 14/063,800

(22) Filed: Oct. 25, 2013

(65) Prior Publication Data

US 2014/0161452 A1 Jun. 12, 2014

(30) Foreign Application Priority Data

Dec. 11, 2012 (JP) ................................ 2012-270737

(51) Int. Cl.
*H04J 14/06* (2006.01)
*H04B 10/04* (2006.01)
*H04B 10/12* (2006.01)
*H04B 10/06* (2006.01)
*H04B 10/588* (2013.01)

(52) U.S. Cl.
CPC .............. *H04J 14/06* (2013.01); *H04B 10/588* (2013.01)

(58) Field of Classification Search
CPC ............................... H04B 10/588; H04J 14/06
USPC .......................................... 398/65, 184, 205
See application file for complete search history.

(56) References Cited

U.S. PATENT DOCUMENTS 5,400,164 A * 3/1995 Kurtzke ................ G02F 1/3538
                                                    359/326
5,798,853 A * 8/1998 Watanabe .......... H04B 10/2531
                                                    359/300

(Continued)

FOREIGN PATENT DOCUMENTS

JP    2011-215603    10/2011
WO    2011052075    5/2011

OTHER PUBLICATIONS

Govind P. Agrawal, Nonlinear Fiber Optics, $4^{th}$ Edition, Elsevier, Academic Press, Oct. 24, 2006, pp. 177-179, 182-183, 226-228.

(Continued)

*Primary Examiner* — Ken Vanderpuye
*Assistant Examiner* — Abbas H Alagheband
(74) *Attorney, Agent, or Firm* — Fujitsu Patent Center

(57) ABSTRACT

An all-optical modulator includes a directional coupling unit that multiplexes, on a carrier light beam, a signal light beam of a modulation signal that a carrier signal at a characteristic frequency is modulated with an information signal. The all-optical modulator includes a nonlinear medium that cross-phase-modulates the carrier light beam with the multiplexed signal light beam, and frequency-multiplexes the information signal in the signal light beam on the carrier light beam to generate an optical frequency division multiplexed signal. The all-optical modulator includes a monitoring control unit that controls a polarization control unit that controls a polarization state of the signal light beam in a direction in which an intensity of a modulation component takes a maximum value, based on the intensity of the modulation component involved in a modulation signal at a desired characteristic frequency of the optical frequency division multiplexed signal.

8 Claims, 15 Drawing Sheets

(56) References Cited

U.S. PATENT DOCUMENTS

| | | | |
|---|---|---|---|
| 7,146,103 B2* | 12/2006 | Yee | H04B 10/2507 398/152 |
| 7,447,436 B2* | 11/2008 | Yee | H04B 10/50 398/152 |
| 7,639,945 B2* | 12/2009 | Tamura | G02F 1/395 398/152 |
| 2006/0159463 A1* | 7/2006 | Futami | G01J 11/00 398/152 |
| 2007/0211252 A1* | 9/2007 | Futami | G01J 9/04 356/364 |
| 2010/0021105 A1* | 1/2010 | Watanabe | G02F 1/395 385/11 |
| 2011/0229138 A1* | 9/2011 | Watanabe | H04B 10/5051 398/79 |
| 2012/0020665 A1* | 1/2012 | Watanabe | G02F 1/3515 398/65 |
| 2012/0189308 A1* | 7/2012 | Watanabe | H04B 10/07 398/79 |

OTHER PUBLICATIONS

Govind. P. Agrawal, Nonlinear Fiber Optics, 4th Edition, Elsevier, Academic Press, Oct. 24, 2006, pp. 177-179, 182-183, 228.

K. K. Y. Wong et al., "Polarization-Independent One-Pump Fiber-Optical Parametric Amplifier", IEEE Photonics Technology Letters, vol. 14, No. 11, Nov. 2002, p. 1506-1508.

C. H. Kwok et. al., "Polarization-Insensitive All-Optical NRZ-to-RZ Format Conversion by Spectral Filtering of a Cross Phase Modulation Broadened Signal Spectrum", IEEE Journal of Selected Topics in Quantum Electronics, vol. 12, No. 3, May/Jun. 2006, pp. 451-458.

S. Watanabe et. al., All-Optical Data Frequency Multiplexing on Single-Wavelength Carrier Light by Sequentially Provided Cross-Phase Modulation in Fiber, IEEE Journal of Selected Topics in Quantum Electronics, vol. 18, No. 2, Mar./Apr. 2012, pp. 577-584.

* cited by examiner

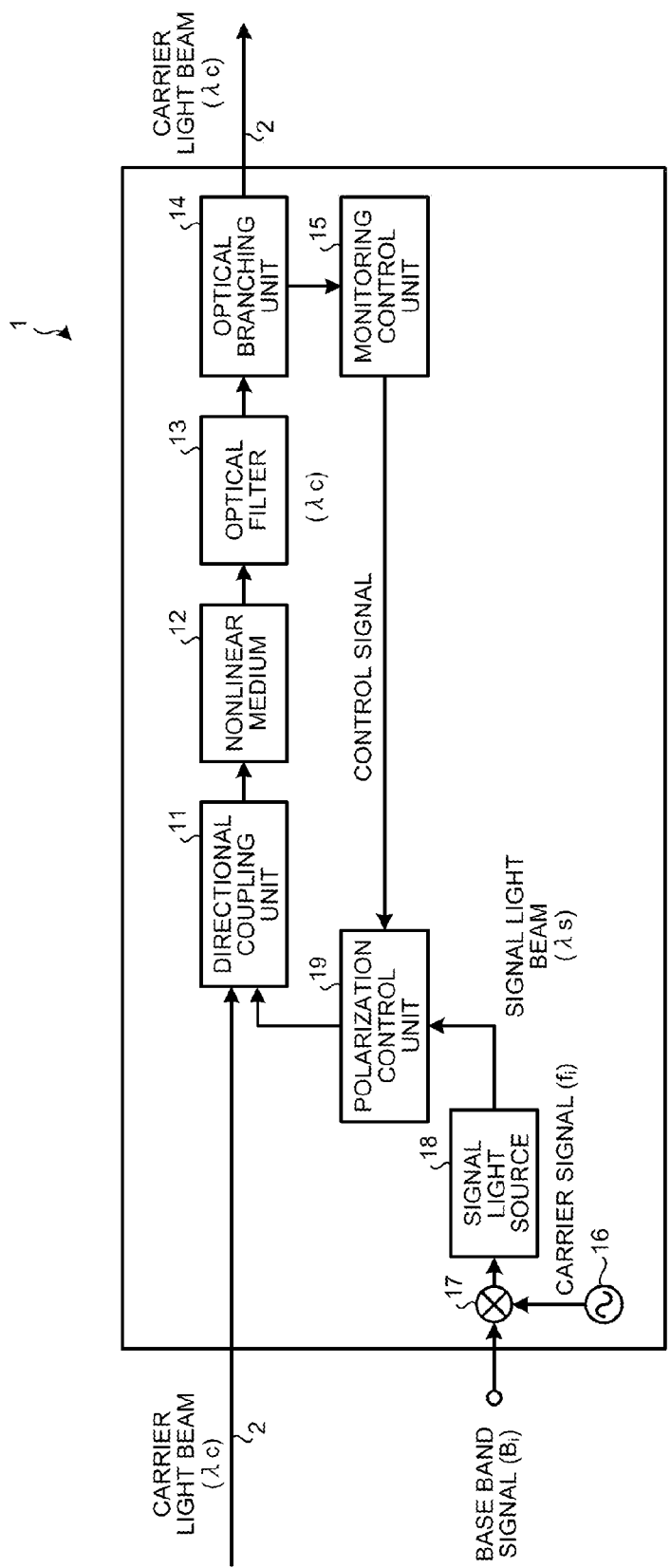

POLARIZED PUMP LIGHT WAVE

POLARIZED PROBE LIGHT WAVE

POLARIZED PUMP LIGHT WAVE

POLARIZED PROBE LIGHT WAVE

POLARIZED PUMP LIGHT WAVE

POLARIZED PROBE LIGHT WAVE

POLARIZED PUMP LIGHT WAVE

POLARIZED PROBE LIGHT WAVE

OPTICAL FREQUENCY DIVISION MULTIPLEXER AND POLARIZATION CONTROL METHOD

CROSS-REFERENCE TO RELATED APPLICATION

This application is based upon and claims the benefit of priority of the prior Japanese Patent Application No. 2012-270737, filed on Dec. 11, 2012, the entire contents of which are incorporated herein by reference.

FIELD

The embodiments discussed herein are related to an optical frequency division multiplexer and a polarization control method.

BACKGROUND

In future optical networks, such techniques may be requested in which optical signals can be multiplexed in relay nodes and terminal station devices in optical networks, or in the midway point of transmission lines, for example. For one of promising techniques for multiplexing, an optical frequency division multiplexing technique is known. The optical frequency division multiplexing technique is a method in which information signals at different subcarrier frequencies are all-optically multiplexed on a carrier light beam at a single wavelength for transmission.

In the case where typical signal multiplexing techniques are sorted, there is an O/E/O method that implements signal multiplexing in which an optical signal (O) is temporarily converted into an electrical signal (E), the electrical signal is multiplexed, and the electrical signal is again converted into an optical signal (O). Moreover, there is an all-optical signal multiplexing method that does not involve optoelectric conversion into electrical signals.

The O/E/O method can adopt a multiplexing method such as time division multiplexing, phase multiplexing, and frequency multiplexing, for example. However, processing time becomes longer as the number of signals to be multiplexed is increased, and in addition to that, loads are gathered on devices on the downstream side as the number of major nodes is increased. Moreover, the use of electrical signal processing causes degraded energy efficiency, and puts limitations on processing speed. Under the present circumstances, a processing speed of a few tens GHz is the upper limit.

On the other hand, for the all-optical signal multiplexing method, a wavelength multiplexing method is known, for example. In the wavelength multiplexing method, a plurality of carrier light beams at different wavelengths is subjected to base band modulation, and multiplexed and demultiplexed using an optical multiplexing and demultiplexing filter. Therefore, in performing multiplexing at narrow wavelength (frequency) intervals, considerably highly accurate wavelength control may be necessary at a transmitting station and a wavelength demultiplexer because the multiplexing greatly depends on the stability of the oscillation wavelength of a light source. Thus, it is difficult to perform multiplexing at narrow wavelength (frequency) intervals.

Therefore, in these years, an optical frequency division multiplexing technique is known as the all-optical signal multiplexing method. In the optical frequency division multiplexing technique, signal multiplexing is performed using an all-optical modulator whose processing speed limit is far beyond the processing speed limit of the electrical signal. It is unnecessary to separate signals using a multiplexing and demultiplexing filter, and multiplexed signals can be electrically separated using a single O/E converter and a typical narrow band RF filter. Thus, the number of O/E converters to be allocated to multiplexed signals can be greatly reduced, and signals can be highly densely multiplexed and separated across a wide band.

In the optical frequency division multiplexing technique, in the case where optical frequency division multiplexing is performed in all-optical signal multiplexing, an optical modulator is used in the midway point of a transmission line or in the midway point of a node. The optical modulator for use in the optical frequency division multiplexing technique includes a lithium niobate optical modulator (a $LNbO_3$ modulator) and an electroabsorption modulator, for example. However, these modulators are devices of a large insertion loss or of large polarization dependence. Moreover, since the optical modulator modulates electrical signals, the optical modulator has limitations on the processing speed.

Therefore, an all-optical modulator is known in which a nonlinear medium is used and cross phase modulation (XPM) between a carrier light beam and a signal light beam is used. In a method in which the cross phase modulation effect of a nonlinear medium is adopted, the processing speed is significantly faster than electrical processing because processing can be performed at a femto second order response speed due to the use of the nonlinear optical effect. Moreover, since the method uses an optical fiber as a nonlinear medium, the method is advantageous in that the insertion loss is small and coupling to a transmission line is excellent.

International Publication Pamphlet No. WO 2011/052075
Japanese Laid-open Patent Publication No. 2011-215603.

However, even the all-optical modulator using a nonlinear medium has polarization dependence. An ideal polarization state is a state in which the polarization state of a carrier light beam and the polarization state of a signal light beam are parallel with each other, and a phase shift amount caused by cross phase modulation becomes highest. On the other hand, the worst polarization state is a state in which the polarization state of the carrier light beam and the polarization state of the signal light beam are orthogonal to each other, and the maximum value of the phase shift amount caused by cross phase modulation is reduced to one-third, or reduced by 4.8 dB, for example, from the maximum value as compared with the ideal state. In the case where such an optical modulator is used to multiplex signals from multiple points, a level difference of 4.8 dB occurs between multiplexed signals at the maximum. In other words, it can be said that the all-optical modulator using cross phase modulation greatly depends on the polarization state of the signal light beam and the polarization state of the carrier light beam.

It is also considered to adopt a polarization diversity configuration for a method of solving polarization dependence. However, although this method can solve polarization dependence on one hand, the number of parts is increased to hike costs as well as to increase the insertion loss on the other hand.

SUMMARY

According to an aspect of an embodiment, an optical frequency division multiplexer includes a nonlinear medium and a control unit. The nonlinear medium multiplexes, on a carrier light beam, a signal light beam of a modulation signal that a carrier signal at a characteristic frequency is modulated with an information signal. The nonlinear medium cross-phase-modulates the carrier light beam with the signal light beam, frequency-multiplexes the information signal in the signal light beam on the carrier light beam. The nonlinear medium generates an optical frequency division multiplexed signal, and outputs the optical frequency division multiplexed signal. The control unit controls a polarization state of the signal light beam in a direction in which an intensity of a modulation component takes a maximum value, based on the intensity of the modulation component involved in a modulation signal at a desired characteristic frequency of the optical frequency division multiplexed signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an illustration of an exemplary all-optical modulator according to a first embodiment;

DESCRIPTION OF EMBODIMENTS

Figure 2A:
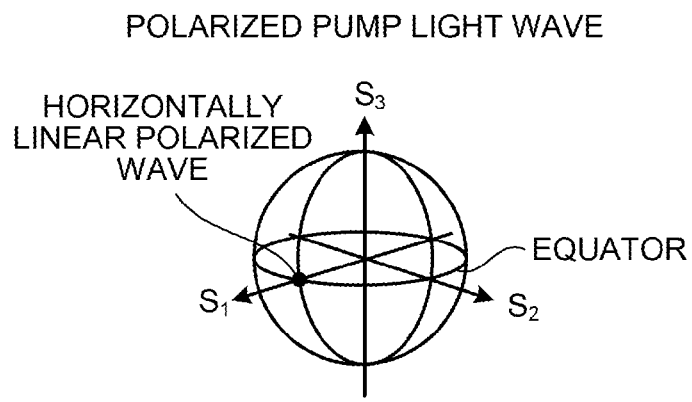
FIGS. 2A and 2B are illustrations in which a polarized pump light wave (a horizontally linear polarized wave) and a polarized probe light wave (rotated from a horizontally linear polarized wave to a vertically linear polarized wave) are three-dimensionally expressed on a Poincare sphere.

Preferred embodiments of the present invention will be explained with reference to accompanying drawings.

It is noted that the disclosed techniques will not be limited by the embodiments. Moreover, the embodiments described below may be appropriately combined in the scope with no discrepancy.

[a] First Embodiment

FIG. 1 is an illustration of an exemplary all-optical modulator according to a first embodiment. An all-optical modulator 1 illustrated in FIG. 1 is connected to an o ptical transmission line 2, and includes a directional coupling unit 11, a nonlinear medium 12, an optical filter 13, an optical branching unit 14, a monitoring control unit 15, an oscillator 16, a mixer 17, a signal light source 18, and a polarization control unit 19.

The oscillator 16 can oscillate desired frequencies, and oscillates and outputs a carrier signal $f_i$ at an RF frequency, for example, which is a characteristic frequency. It is noted that the characteristic frequency is supposed to be allocated to individual base band signals $B_i$, which are information signals. The base band signal $B_i$ is information itself to be transmitted. When the mixer 17 receives the carrier signal $f_i$ from the oscillator 16 and the base band signal $B_i$, the mixer 17 modulates the carrier signal $f_i$ with the base band signal $B_i$ to generate a subcarrier modulation signal. Moreover, the mixer 17 outputs the generated subcarrier modulation signal to the signal light source 18. The signal light source 18 outputs a signal light beam at a center wavelength $\lambda s$ whose subcarrier is modulated. The polarization control unit 19 controls the polarization state of the signal light beam $\lambda s$ according to a control signal from the monitoring control unit 15.

Moreover, the directional coupling unit 11 multiplexes a carrier light beam $\lambda c$ on the signal light beam $\lambda s$ transmitted from the optical transmission line 2. It is noted that the carrier light beam $\lambda c$ is a CW (continuous wave) light beam or the like, for example. The nonlinear medium 12 corresponds to an optical fiber, for example. The nonlinear medium 12 cross-phase-modulates the carrier light beam $\lambda c$ with the signal light beam $\lambda s$, frequency-multiplexes information in the signal light beam $\lambda s$ on the carrier light beam $\lambda c$, and generates and outputs an optical frequency division multiplexed signal.

The optical filter 13 removes the signal light beam $\lambda s$ outputted from the nonlinear medium 12, and extracts the carrier light beam $\lambda c$ and the optical frequency division multiplexed signal. The optical branching unit 14 transmits the extracted carrier light beam and the extracted optical frequency division multiplexed signal through the optical transmission line 2, optically branches a part of the light beam and a part of the signal, and outputs them to the monitoring control unit 15. The monitoring control unit 15 monitors the intensity of the modulation component of the optical frequency division multiplexed signal from a part of the carrier light beam and a part of the optical frequency division multiplexed signal, which are optically branched. Moreover, the monitoring control unit 15 controls the polarization control unit 19 to control the polarization state of the signal light beam based on the monitored result.

Here, the cross phase modulation of the nonlinear medium 12 will be described. Cross phase modulation is the effect that in the case where a probe light beam such as a carrier light beam, for example, and a pump light beam such as a signal light beam, for example, are inputted to the nonlinear medium 12, a refractive index change occurs in the nonlinear medium 12 corresponding to the intensity of the pump light beam, and the phase of the probe light beam is modulated.

Suppose that the intensity of the probe light beam is Ppro, the intensity of the pump light beam is Ppum, the length of the nonlinear medium 12 is L, the nonlinear coefficient of the nonlinear medium 12 is $\gamma$, and the conditions for the polarization state of the pump light beam and the polarization state of the probe light beam are set the same. A nonlinear phase shift amount $\phi NL$ can be expressed by equation $\phi NL = \phi SPM + \phi XPM = \gamma PproL + 2\gamma PpumL$.

The right-hand first term "$\gamma PproL$" is a nonlinear phase shift amount $\phi SPM$ due to the light intensity of the probe light beam itself, and caused by self phase modulation (SPM). Moreover, the right-hand second term "$2\gamma PpumL$" is a nonlinear phase shift amount $\phi XPM$ caused by cross phase modulation (XPM) due to the pump light beam, and proportional to twice a product of the intensity of the pump light beam and the fiber length.

Furthermore, in the case where the polarization state of the probe light beam and the polarization state of the pump light beam are in the orthogonal state, the nonlinear phase shift amount $\phi NL$ can be expressed by equation $\phi NL = \phi SPM + \phi XPM = \gamma PproL + 2\gamma PpumL/3$. In other words, since the nonlinear phase shift amount $\phi XPM$ takes $2\gamma PpumL/3$, the nonlinear phase shift amount $\phi XPM$ is reduced to one-third of "$2\gamma PpumL$" of the maximum value, that is, reduced by 4.8 dB from the maximum value.

Figure 2B:
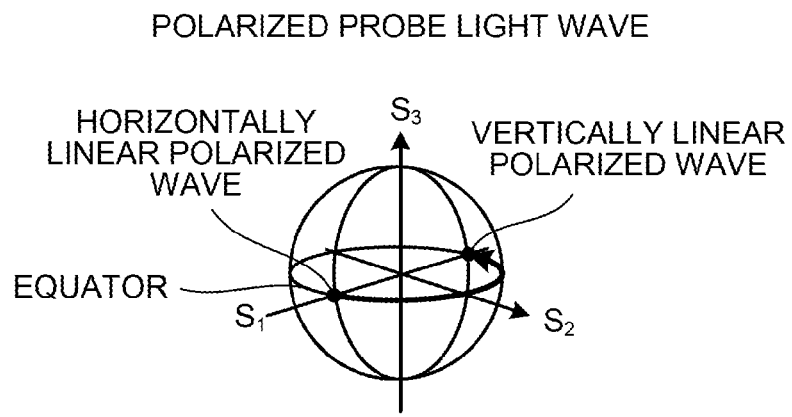
Figure 3A:
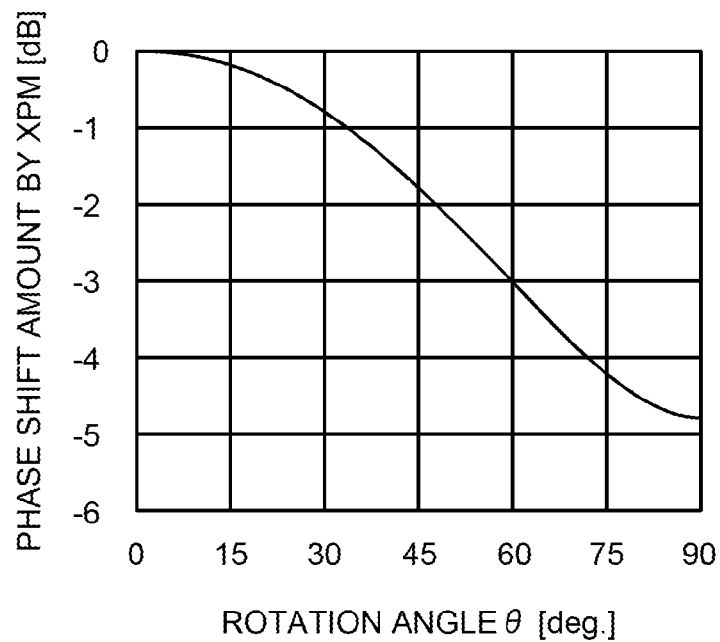
FIGS. 3A and 3B are illustrations of an exemplary calculated result of a phase shift amount by XPM corresponding to the rotation angle of the probe light beam in the example illustrated in FIGS. 2A and 2B.
Figure 3B:
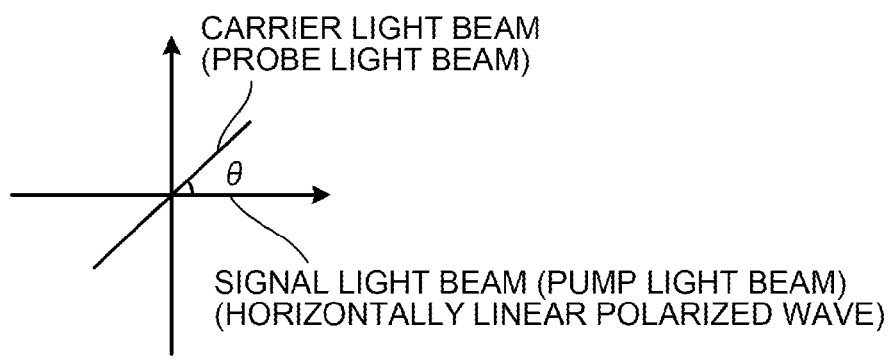

FIGS. 2A and 2B are illustrations in which a polarized pump light wave (a horizontally linear polarized wave) and a polarized probe light wave (rotated from a horizontally linear polarized wave to a vertically linear polarized wave) are three-dimensionally expressed on a Poincare sphere. FIGS. 3A and 3B are illustrations of an exemplary calculated result of a phase shift amount by XPM corresponding to the rotation angle of the probe light beam in the example illustrated in FIGS. 2A and 2B. On the Poincare sphere illustrated in FIG. 2A, the polarization state of the pump light beam expresses a horizontally linear polarized wave. On the Poincare sphere illustrated in FIG. 2B, a vertically linear polarized wave is expressed in which the probe light beam is rotated at an angle of 90 degrees from a horizontally linear polarized wave along the equator of the Poincare sphere while the polarization state of the probe light beam is maintaining the linear polarization state. In the case where the polarization state of the pump light beam is fixed, for example, the phase shift amount by XPM is changed according to the rotation operation of the probe light beam. The horizontal axis illustrated in FIG. 3A expresses a rotation angle $\theta$ of the polarization state of the probe light beam. When the polarization state is two-dimensionally displayed using Jones vectors, the angle relationship is expressed as illustrated in FIG. 3B. The vertical axis expresses the calculated result that the phase shift amount by XPM is normalized by a maximum value. In the case where the rotation angle $\theta$ is at an angle of 0 degree and the polarization state of the pump light beam and the polarization state of the probe light beam are the same, that is, in the case where the relative angle between the pump light beam and the probe light beam is at an angle of 0 degree, the phase shift amount by XPM is the maximum value, "0" dB. Moreover, as illustrated in FIG. 3B, according to the result of calculating the phase shift amount by XPM corresponding to a change in the rotation angle $\theta$ of the probe light beam, the phase shift amount by XPM is more reduced as the relative angle between the polarization state of the probe light beam and the polarization state of the pump light beam becomes greater. In the case where the rotation angle $\theta$ is at an angle of 45 degrees, the phase shift amount by XPM is reduced by 1.8 dB from the maximum value. Moreover, in the case where the rotation angle $\theta$ is at an angle of 90 degrees, the phase shift amount by XPM is reduced by 4.8 dB from the maximum value.

Figure 4A:
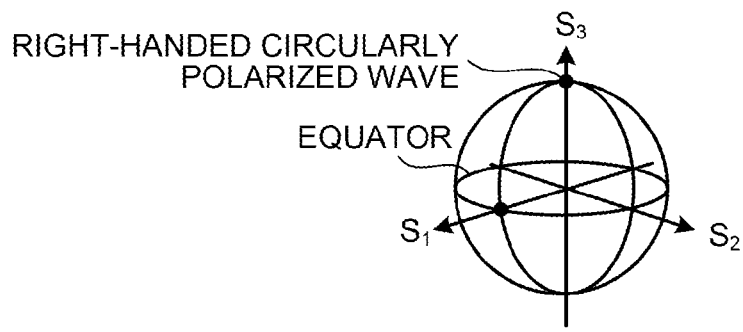
FIGS. 4A and 4B are illustrations in which a polarized pump light wave (a right-handed circularly polarized wave) and a polarized probe light wave (rotated from a horizontally linear polarized wave to a vertically linear polarized wave) are three-dimensionally expressed on a Poincare sphere.
Figure 4B:
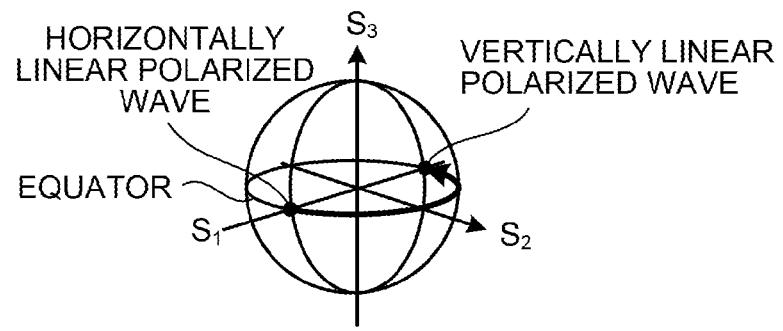
Figure 5A:
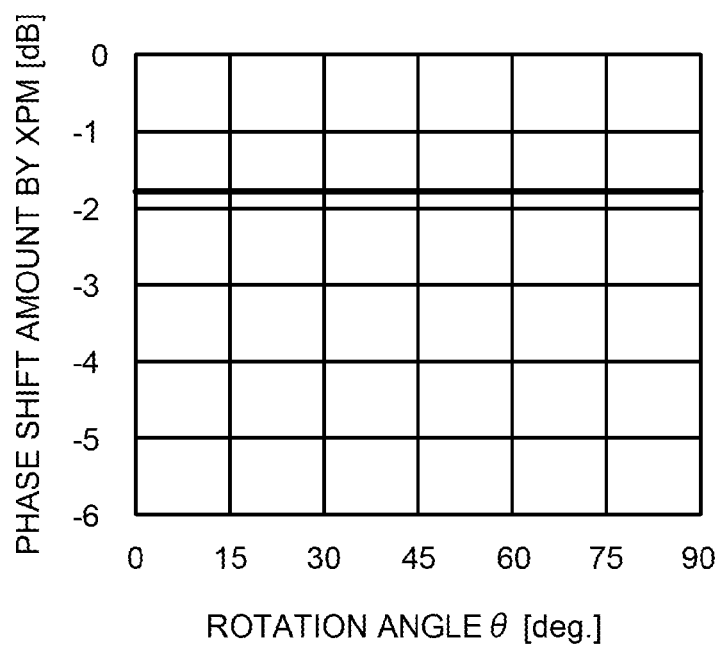
FIGS. 5A and 5B are an illustration of an exemplary calculated result of a phase modulation amount by XPM corresponding to the rotation angle of the probe light beam in the example illustrated in FIGS. 4A and 4B.
Figure 5B:
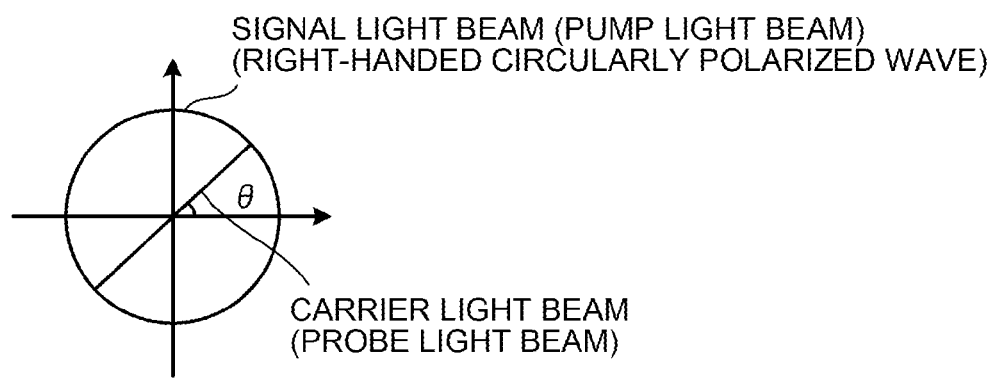

FIGS. 4A and 4B are illustrations in which a polarized pump light wave (a right-handed circularly polarized wave) and a polarized probe light wave (rotated from a horizontally linear polarized wave to a vertically linear polarized wave) are three-dimensionally expressed on a Poincare sphere. FIGS. 5A and 5B are illustrations of an exemplary calculated result of a phase shift amount by XPM corresponding to the rotation angle of the probe light beam in the example illustrated in FIGS. 4A and 4B. On the Poincare sphere illustrated in FIG. 4A, the polarization state of the pump light beam expresses a right-handed circularly polarized wave. On the Poincare sphere illustrated in FIG. 4B, a vertically linear polarized wave is expressed in which the probe light beam is rotated at an angle of 90 degrees from a horizontally linear polarized wave along the equator of the Poincare sphere while the polarization state of the probe light beam is maintaining linear polarization. In this state, since the polarization state of the pump light beam is circular polarization, the relative angle relationship is maintained as illustrated in FIG. 5B. In FIG. 5A, even though the polarization state of the probe light beam is rotated from the horizontally linear polarized wave to the vertically linear polarized wave, the calculated result of a phase shift amount by XPM takes a constant value by a reduction of 1.8 dB from the maximum value because the relative angle relationship is consent.

Figure 6A:
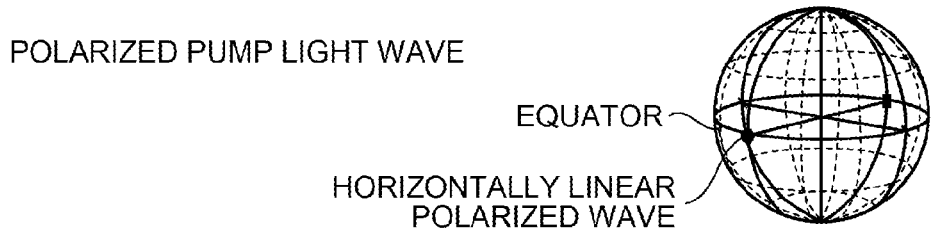
FIGS. 6A and 6B are illustrations in which a polarized pump light wave (a horizontally linear polarized wave) and a polarized probe light wave (the wave is variable) are three-dimensionally expressed on a Poincare sphere.
Figure 6B:
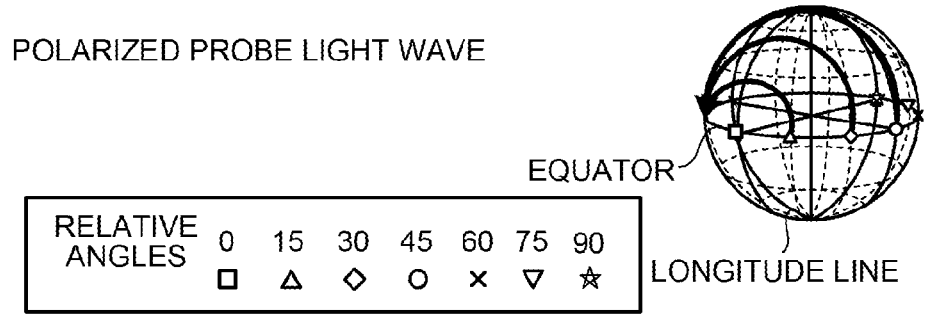
Figure 7:
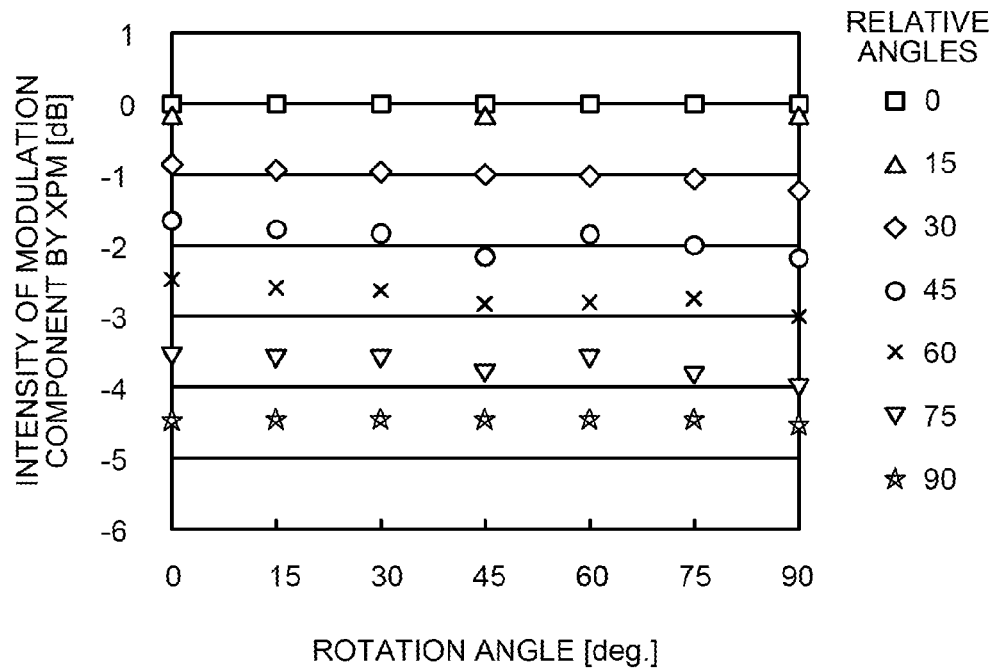
FIG. 7 is an illustration of an exemplary result of actual measurements of the intensity of a modulation component by XPM corresponding to the rotation angle of the probe light beam in the example illustrated in FIGS. 6A and 6B.

FIGS. 6A to 9 are diagrams of the result of actual measurements of the intensity of a modulation component reflecting the phase modulation amount by XPM according to the rotation operation of the polarization state of the probe light beam. FIGS. 6A and 6B are illustrations in which a polarized pump light wave (a horizontally linear polarized wave) and a polarized probe light wave (the wave is variable) are three-dimensionally expressed on a Poincare sphere. FIG. 7 is an illustration of an exemplary result of actual measurements of the intensity of a modulation component by XPM corresponding to the rotation angle of the probe light beam in the example illustrated in FIGS. 6A and 6B. On the Poincare sphere illustrated in FIG. 6A, the polarization state of the pump light beam expresses a horizontally linear polarized wave. On the Poincare sphere illustrated in FIG. 6B, the case is expressed where the polarization state of the probe light beam at relative angles with respect to the polarization state of the pump light beam was rotated from the horizontally linear polarized wave along the equator of the Poincare sphere. It is noted that seven types of relative angles were exemplified, an angle of 0 degree, an angle of 15 degrees, an angle of 30 degrees, an angle of 45 degrees, an angle of 60 degrees, an angle of 75 degrees, and an angle of 90 degrees, for example, along the equator from the polarization state of the pump light beam on the equator.

In FIG. 7, in the case where the relative angle between the polarization state of the probe light beam and the polarization state of the pump light beam is at an angle of 0 degree, an angle of 15 degrees, an angle of 30 degrees, or an angle of 45 degrees, the result of actual measurements was obtained that the intensity of the modulation component by XPM was reduced by 1.8 dB or less from the maximum value. In contrast to this, in the case where the relative angle is at an angle of 60 degrees, an angle of 75 degrees, or an angle of 90 degrees, the result of actual measurements was obtained that the intensity of the modulation component by XPM was reduced by 4.8 dB at the maximum beyond 1.8 dB from the maximum value.

Figure 8A:
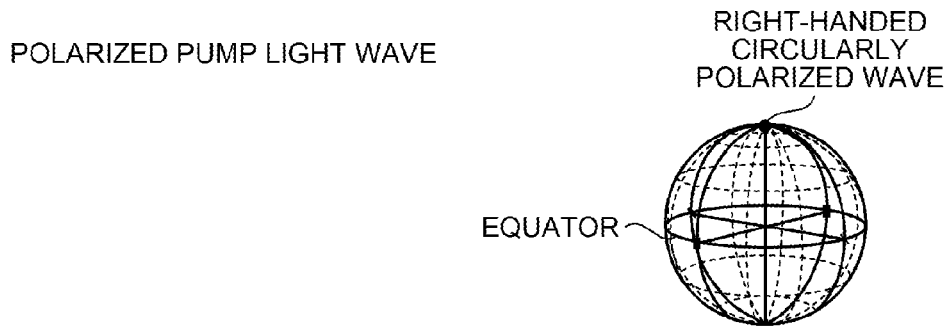
FIGS. 8A and 8B are illustrations in which a polarized pump light wave (a right-handed circularly polarized wave) and a polarized probe light wave (the wave is variable) are three-dimensionally expressed on a Poincare sphere.
Figure 8B:
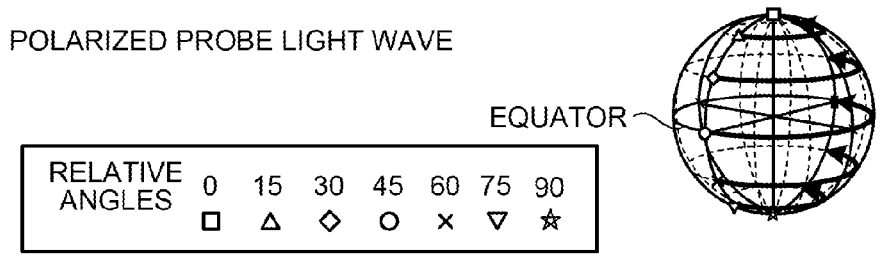
Figure 9:
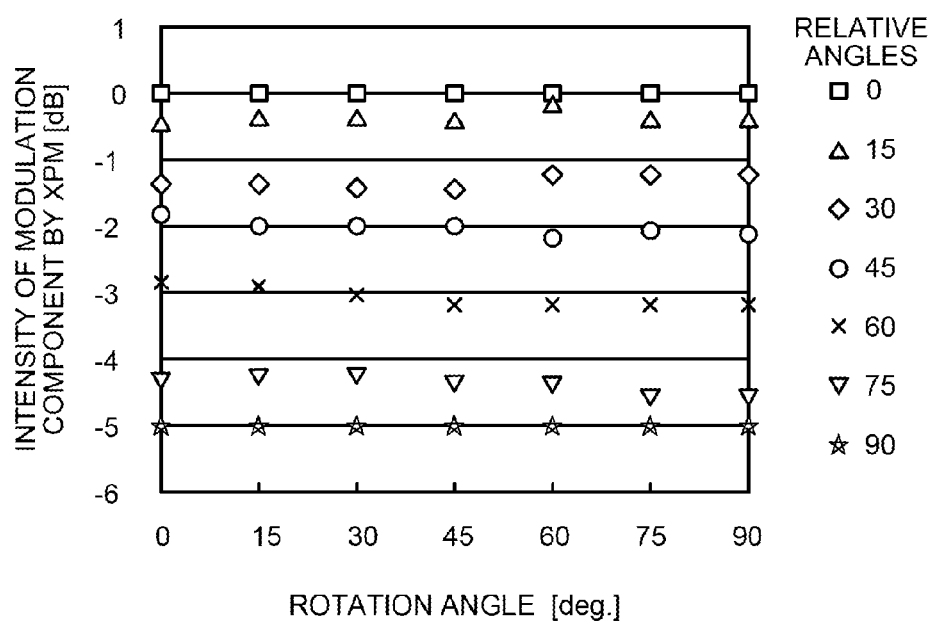
FIG. 9 is an illustration of an exemplary result of actual measurements of the intensity of a modulation component by XPM corresponding to the rotation angle of the probe light beam in the example illustrated in FIGS. 8A and 8B.

FIGS. 8A and 8B are illustrations in which a polarized pump light wave (a right-handed circularly polarized wave) and a polarized probe light wave (the wave is variable) are three-dimensionally expressed on a Poincare sphere. FIG. 9 is an illustration of an exemplary result of actual measurements of the intensity of a modulation component by XPM corresponding to the rotation angle of the probe light beam in the example illustrated in FIGS. 8A and 8B. On the Poincare sphere illustrated in FIG. 8A, the polarization state of the pump light beam expresses a right-handed circularly polarized wave. On the Poincare sphere illustrated in FIG. 8B, the case is expressed where the polarization states of the probe light beams at relative angles were rotated along parallels of latitude on the Poincare sphere. It is noted that seven types of relative angles were exemplified, an angle of 0 degree, an angle of 15 degrees, an angle of 30 degrees, an angle of 45 degrees, an angle of 60 degrees, an angle of 75 degrees, and an angle of 90 degrees, for example, along the longitude line from the polarization state of the pump light beam on the north pole. In FIG. 9, in the case where the relative angle between the polarization state of the probe light beam and the polarization state of the pump light beam is at an angle of 0 degree, an angle of 15 degrees, an angle of 30 degrees, or an angle of 45 degrees, the result of actual measurements was obtained that the intensity of the modulation component by XPM was reduced by about 1.8 dB or less from the maximum value. In contrast to this, in the case where the relative angle is at an angle of 60 degrees, an angle of 75 degrees, or an angle of 90 degrees, the result of actual measurements was obtained that the intensity of the modulation component by XPM was reduced by 4.8 dB at the maximum beyond 1.8 dB from the maximum value.

As a result, in the case where the relative angle between the polarization state of the probe light beam and the polarization state of the pump light beam is within an angle of 45 degrees, in other words, in the case where the polarization state of the probe light beam and the polarization state of the pump light beam are on the same hemisphere of the Poincare sphere, it is revealed that a reduction in the intensity of the modulation component by XPM can be suppressed within 1.8 dB.

Therefore, based on such results, the foregoing all-optical modulator 1 according to the first embodiment will be described. The foregoing probe light beam corresponds to the carrier light beam, for example, and the pump light beam corresponds to the signal light beam, for example. Since the carrier light beam propagates through the optical transmission line 2 such as an optical fiber, the polarization state fluctuates due to the vibrations of the optical transmission line 2, for example, and an environmental change such as the temperature, for example. Since the all-optical modulator 1 receives the carrier light beam in the state in which the polarization state fluctuates, the intensity of the modulation component of the nonlinear medium 12 subjected to optical frequency division multiplexing by XPM is reduced by 4.8 dB at the maximum.

Therefore, the monitoring control unit 15 in the all-optical modulator 1 monitors the intensity of the modulation component of the optical frequency division multiplexed signal. Moreover, in the case where the intensity of the modulation component is reduced beyond 1.8 dB from the maximum value, the monitoring control unit 15 controls the polarization control unit 19 to control the polarization state of the signal light beam in such a way that the maximum value of the intensity of the modulation component is not reduced beyond 1.8 dB. It is noted that the case where the maximum value of the intensity of the modulation component is reduced beyond 1.8 dB means that the polarization state of the signal light beam exists on a hemisphere different from a hemisphere on which the polarization state of the carrier light beam exists when the polarization states are expressed on the Poincare sphere. The polarization control unit 19 converts the polarization state of the signal light beam at an angle of 90 degrees in such a way that the polarization state of the signal light beam is positioned on the same hemisphere on which the polarization state of the carrier light beam exists. The polarization control unit 19 then inputs the signal light beam whose the polarization state is converted at an angle of 90 degrees to the directional coupling unit 11.

As a result, since the polarization state of the signal light beam and the polarization state of the carrier light beam are positioned on the same hemisphere, that is, since the relative angle between the signal light beam and the carrier light beam is within an angle of 45 degrees, a reduction in the intensity of the modulation component of the optical frequency division multiplexed signal by XPM in the nonlinear medium 12 can be suppressed within 1.8 dB. Moreover, since a single optical branching unit 14 is provided to branch the optical frequency division multiplexed signal, the monitoring control unit 15 can also suppress the insertion loss caused by the optical branching unit 14.

The all-optical modulator 1 according to the first embodiment monitors the intensity of the modulation component of the optical frequency division multiplexed signal, and converts the polarization state of the signal light beam at an angle of 90 degrees, in the case where the intensity is reduced beyond 1.8 dB from the maximum value. As a result, a reduction in the intensity of the modulation component caused by the polarization dependence of XPM can be decreased.

Moreover, the all-optical modulator 1 monitors the polarization state of the signal light beam and the polarization state of the carrier light beam, and rotates the polarization state of the signal light beam at an angle of 90 degrees in such a way that the polarization state of the signal light beam is positioned on the same hemisphere on which the polarization state of the carrier light beam exists, in the case where the polarization state of the signal light beam exists on a hemisphere different from a hemisphere on which the polarization state of the carrier light beam exists. As a result, a reduction in the intensity of the modulation component of the optical frequency division multiplexed signal caused by the polarization dependence of XPM can be decreased.

It is noted that the monitoring control unit 15 of the all-optical modulator 1 according to the first embodiment converts the polarization state of the signal light beam at an angle of 90 degrees, in the case where the intensity of the modulation component of the optical frequency division multiplexed signal is reduced beyond 1.8 dB from the maximum value. However, the threshold at which the polarized light is rotated is not limited to a point in time at which the intensity exceeds 1.8 dB from the maximum value. Such a configuration may be possible in which the threshold is set to a given point in time in the range in which the intensity is reduced by 4.8 dB beyond 1.8 dB from the maximum value and the polarization state of the signal light beam is converted at an angle of 90 degrees.

[b] Second Embodiment

Figure 10:
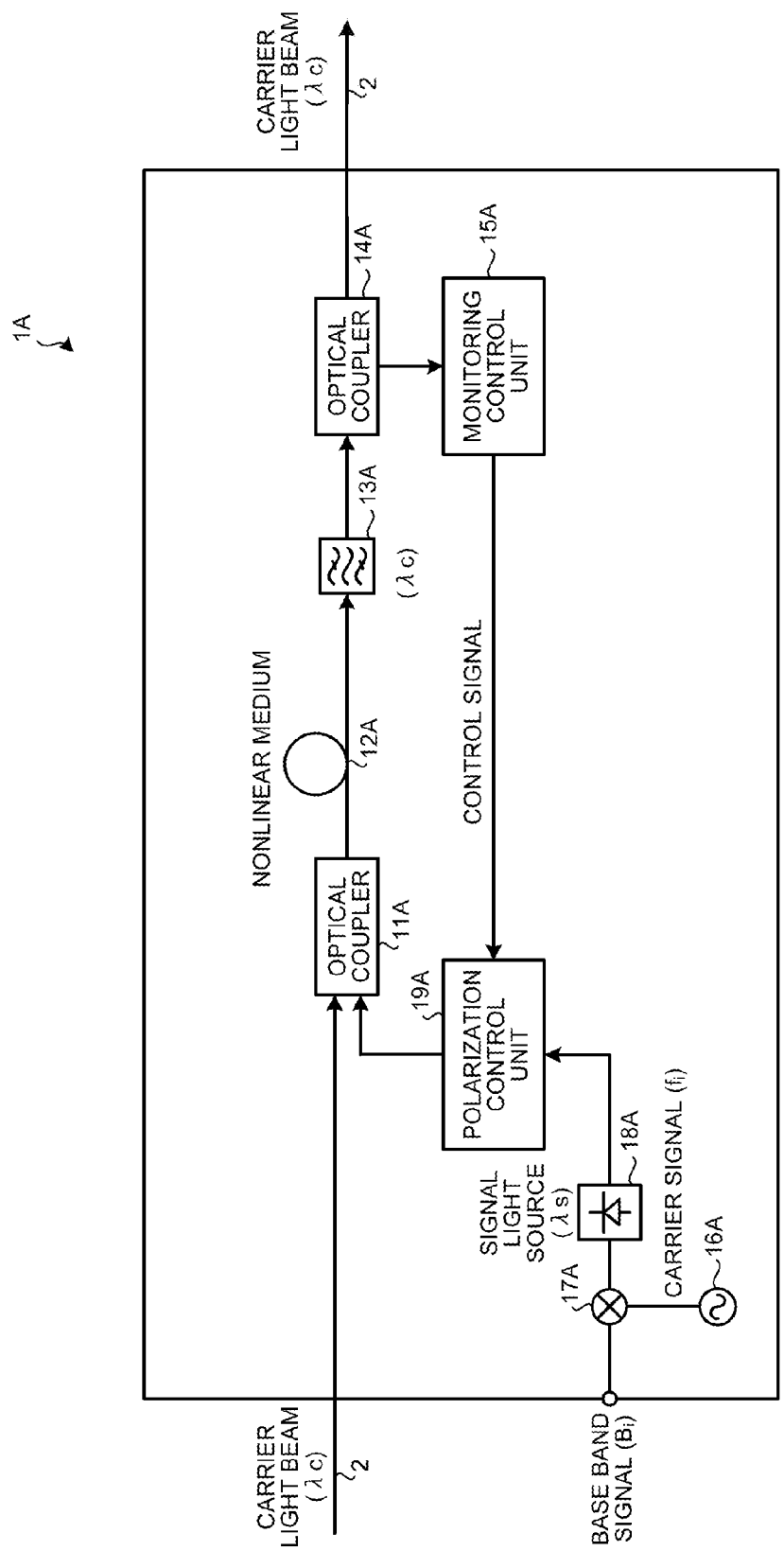
FIG. 10 is an illustration of an exemplary all-optical modulator according to a second embodiment.

FIG. 10 is an illustration of an exemplary all-optical modulator according to a second embodiment. It is noted that the same reference numerals and signs are designated to the same configurations of the all-optical modulator 1 illustrated in FIG. 1, and the description of the overlapping configurations and operations is omitted. An all-optical modulator 1A illustrated in FIG. 10 includes an optical coupler 11A, a nonlinear medium 12A, an optical filter 13A, an optical coupler 14A, a monitoring control unit 15A, an oscillator 16A, a mixer 17A, a signal light source 18A, and a polarization control unit 19A.

The oscillator 16A oscillates and outputs a carrier signal $f_i$ at an RF frequency, for example, which is a characteristic frequency. When the mixer 17A receives a carrier signal $f_i$ from the oscillator 16A and a base band signal $B_i$, the mixer 17A modulates the carrier signal $f_i$ with the base band signal $B_i$ to generate a subcarrier modulation signal. Moreover, the mixer 17A outputs the generated subcarrier modulation signal to the signal light source 18A. The signal light source 18A outputs a signal light beam at a center wavelength λs whose subcarrier is modulated. The polarization control unit 19A controls the polarization state of the signal light beam λs according to a control signal from the monitoring control unit 15A.

Furthermore, the optical coupler 11A multiplexes a carrier light beam λc on the signal light beam λs transmitted from the optical transmission line 2. The nonlinear medium 12A corresponds to a high nonlinear fiber, for example. The nonlinear medium 12A cross-phase-modulates the carrier light beam λc with the signal light beam λs, frequency-multiplexes information in the signal light beam λs on the carrier light beam λc, and generates and outputs an optical frequency division multiplexed signal.

The optical filter 13A extracts the carrier light beam λc and the optical frequency division multiplexed signal outputted from the nonlinear medium 12A. The optical coupler 14A transmits the extracted carrier light beam and the extracted optical frequency division multiplexed signal through the optical transmission line 2, optically branches a part of the light beam and a part of the signal, and outputs them to the monitoring control unit 15A. The monitoring control unit 15A monitors the intensity of the modulation component of the optical frequency division multiplexed signal from a part of the carrier light beam and a part of the optical frequency division multiplexed signal, which are optically branched. Moreover, the monitoring control unit 15A controls the polarization control unit 19A to control the polarization state of the signal light beam based on the monitored result.

Figure 11:
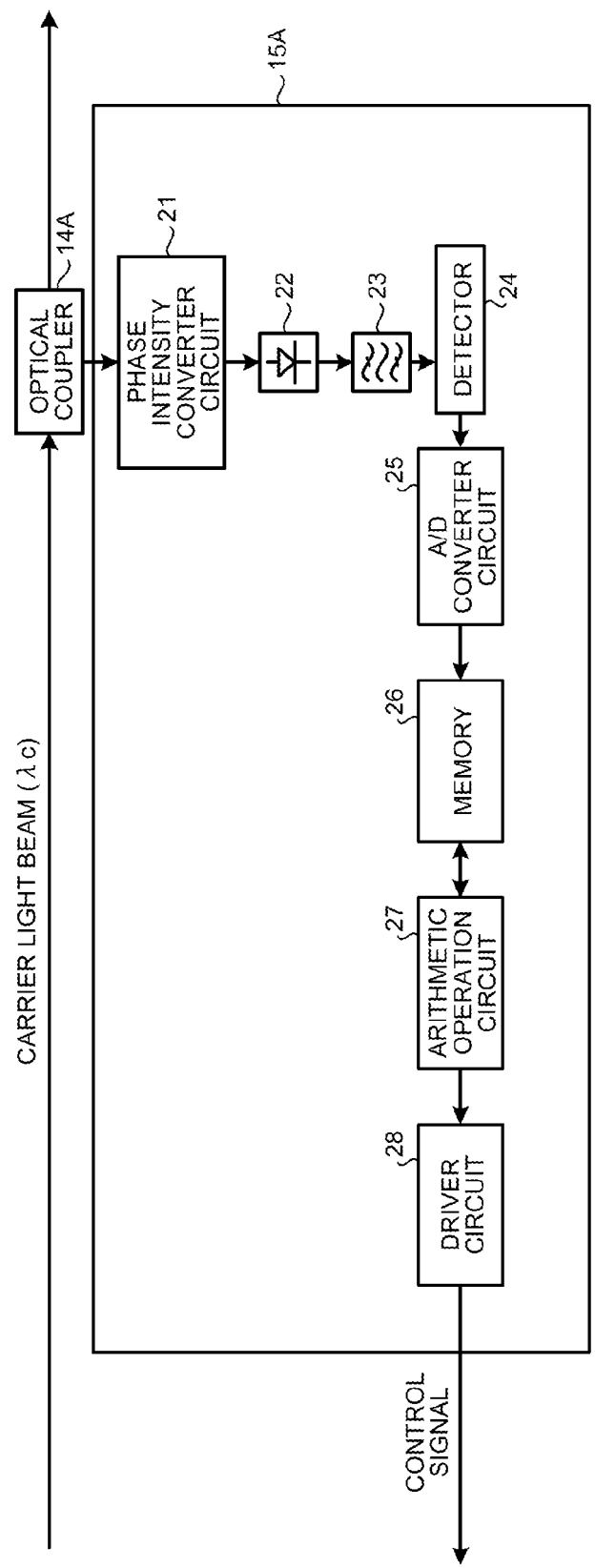
FIG. 11 is an illustration of an exemplary monitoring control unit.

FIG. 11 is an illustration of an exemplary monitoring control unit 15A. The monitoring control unit 15A illustrated in FIG. 11 includes a phase intensity converter circuit 21, a photodetector 22, an RF filter 23, a detector 24, an A/D converter circuit 25, a memory 26, an arithmetic operation circuit 27, and a driver circuit 28. It is noted that since the optical frequency division multiplexed signal is a cross phase modulation signal, the modulation component appears on the upper wave band and the lower wave band of the carrier light beam. The phases of the modulation components are inverted to each other at an angle of 90 degrees on the upper wave band and on the lower wave band. Therefore, even though the photodetector 22 receives the carrier light beam, the phases are canceled with each other when the phases are detected simultaneously, and the intensity of the modulation component is not enabled to be detected. Thus, the monitoring control unit 15A contains the phase intensity converter circuit 21 that converts the phase modulation signal of the optical frequency division multiplexed signal into an intensity modulated signal. For the phase intensity converter circuit 21, the following may be used such as a dispersive medium (a dispersion-compensating fiber) corresponding to a frequency band, a coherent receiver including a local light beam (LO), and an optical filter that removes a modulation component of one of the upper wave band and the lower wave band.

The phase intensity converter circuit 21 converts the phase modulation signal of a part of the optical frequency division multiplexed signal optically branched at the optical coupler 14A into an intensity modulated signal. The photodetector 22 optoelectrically converts the intensity modulated signal that is an optical signal. The RF filter 23 extracts a modulation component at a desired characteristic frequency from the optoelectrically converted intensity modulated signal. The detector 24 detects the extracted modulation component at a desired characteristic frequency, and outputs a voltage signal. The A/D converter circuit 25 digitally converts the voltage signal of the modulation component, and stores the signal in the memory 26 as the intensity of the modulation component.

The arithmetic operation circuit 27 compares the history of the intensity of the modulation component stored in the memory 26, determines whether the intensity of the modulation component at a characteristic frequency is reduced beyond a predetermined threshold from the maximum value, and outputs the determined result to the driver circuit 28. It is noted that the arithmetic operation circuit 27 determines whether the intensity of the modulation component is reduced beyond a predetermined threshold of 1.8 dB, for example. In the case where the intensity of the modulation component is reduced beyond 1.8 dB, the driver circuit 28 outputs a control signal to instruct the polarization control unit 19A to rotate the polarization state of the signal light beam at an angle of 90 degrees. The polarization control unit 19A controls the polarization state of the signal light beam in response to the control signal from the driver circuit 28.

As a result, in the case where the intensity of the modulation component is reduced beyond 1.8 dB from the maximum value, the polarization state of the signal light beam is rotated at an angle of 90 degrees, so that a reduction in the intensity of the modulation component can be suppressed within 1.8 dB from the maximum value.

It is noted that for the polarization control unit 19A, the following may be used such as a device equipped with a wave plate, a fiber squeezer device (a fiber stress applying device), a liquid crystal device, and a faraday rotator device, for example. For example, a polarization switch (a product name of Pola Switch) commercially available from General Photonics Corporation can rotate the polarization state of the signal light beam at an angle of 90 degrees by applying a voltage of 2 to 3 V.

The all-optical modulator 1A according to the second embodiment monitors the intensity of the modulation component of the optical frequency division multiplexed signal, and converts the polarization state of the signal light beam at an angle of 90 degrees, in the case where the intensity of the modulation component is reduced beyond 1.8 dB from the maximum value. As a result, a reduction in the intensity of the modulation component of the optical frequency division multiplexed signal caused by the polarization dependence of XPM can be decreased.

Moreover, since the all-optical modulator 1A includes a single optical branching unit 14 that branches the optical frequency division multiplexed signal as compared with a polarization diversity configuration, the insertion loss caused by the optical branching unit 14 can be suppressed.

It is noted that the monitoring control unit 15A of the all-optical modulator 1A according to the second embodiment converts the polarization state of the signal light beam at an angle of 90 degrees, in the case where the intensity of the modulation component is reduced beyond 1.8 dB from the maximum value. However, the threshold at which the polarized light is rotated is not limited to a point in time at which the intensity exceeds 1.8 dB from the maximum value. Such a configuration may be possible in which the threshold is set to a given point in time in the range in which the intensity is reduced by 4.8 dB beyond 1.8 dB from the maximum value and the polarization state of the signal light beam is converted at an angle of 90 degrees.

In the second embodiment, the monitoring control unit 15A is contained in the all-optical modulator 1A. However, the monitoring control unit may be contained in a receiving device that receives the optical frequency division multiplexed signal, not contained in the all-optical modulator 1A. In the following, an embodiment in this case will be described as a third embodiment.

[c] Third Embodiment

Figure 12:
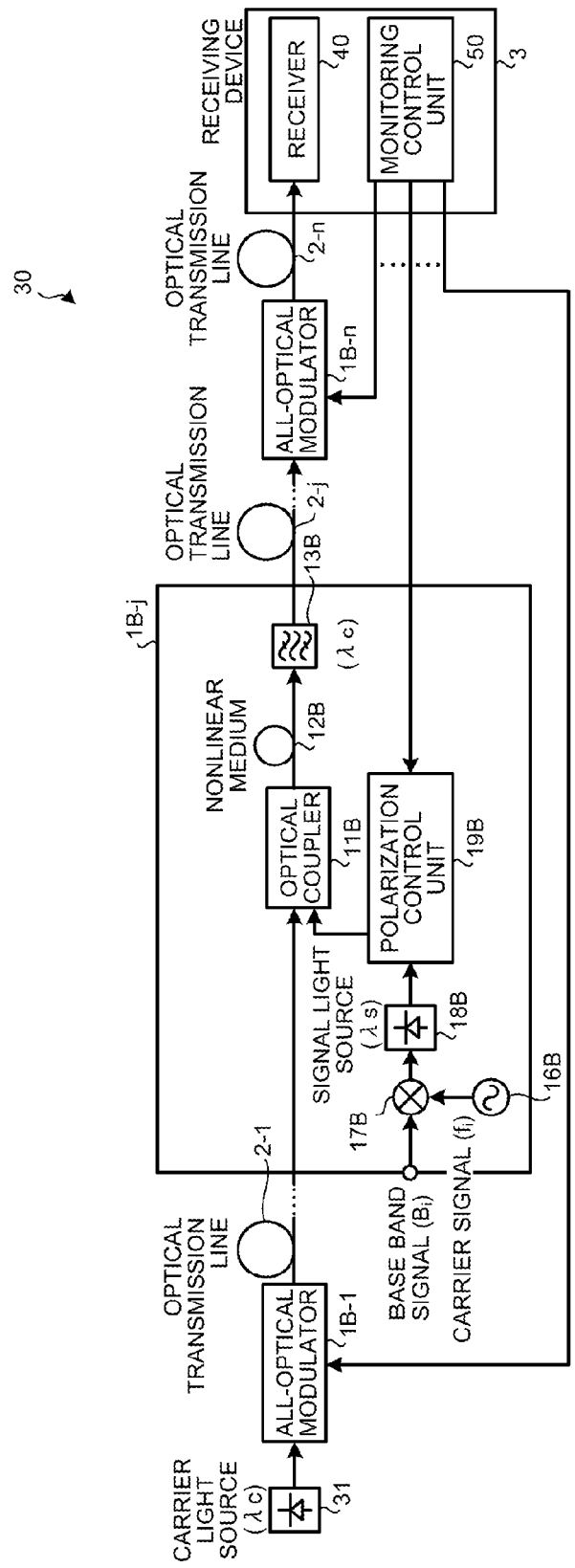
FIG. 12 is an illustration of an exemplary optical network according to a third embodiment.

FIG. 12 is an illustration of an exemplary optical network according to a third embodiment. An optical network 30 illustrated in FIG. 12 includes a carrier light source 31, a plurality of all-optical modulators 1B-1 to 1B-n, and a receiving device 3. The all-optical modulator 1B-1 is connected to the all-optical modulator 1B-j with an optical transmission line 2-1. Moreover, the all-optical modulator 1B-j is connected to the all-optical modulator 1B-n with an optical transmission line 2-j. Furthermore, the all-optical modulator 1B-n is connected to the receiving device 3 with an optical transmission line 2-n.

The all-optical modulator 1B-j includes an optical coupler 11B, a nonlinear medium 12B, an optical filter 13B, an oscillator 16B, a mixer 17B, a signal light source 18B, and a polarization control unit 19B.

The oscillator 16B oscillates and outputs a carrier signal $f_i$ at an RF frequency, for example, which is a characteristic frequency. When the mixer 17B receives a carrier signal $f_i$ from the oscillator 16B and a base band signal $B_i$, the mixer 17B modulates the carrier signal $f_i$ with the base band signal $B_i$ to generate a subcarrier modulation signal. Moreover, the mixer 17B outputs the generated subcarrier modulation signal to the signal light source 18B. The signal light source 18B outputs a signal light beam at a center wavelength λs whose subcarrier is modulated. The polarization control unit 19B controls the polarization state of the signal light beam λs according to a control signal from the receiving device 3.

Furthermore, the optical coupler 11B multiplexes a carrier light beam λc on the signal light beam λs transmitted from the optical transmission line 2. The nonlinear medium 12B corresponds to a high nonlinear fiber, for example. The nonlinear medium 12B cross-phase-modulates the carrier light beam λc with the signal light beam λs, frequency-multiplexes information in the signal light beam λs on the carrier light beam λc, and generates and outputs an optical frequency division multiplexed signal. The optical filter 13B extracts the carrier light beam λc and the optical frequency division multiplexed signal outputted from the nonlinear medium 12B, and outputs the extracted carrier light beam λc and the extracted optical frequency division multiplexed signal to the optical transmission line 2-j. It is noted that since the internal configurations of the other all-optical modulators 1B-1 and 1B-n are the same as the internal configuration of the all-optical modulator 1B-j, the same reference numerals and signs are designated to the same configurations, and the description of the overlapping configurations and operations is omitted.

The all-optical modulator 1B-1 cross-phase-modulates the carrier light beam from the carrier light source 31 with the signal light beam, and transmits the optical frequency division multiplexed signal to the optical transmission line 2-1. The all-optical modulator 1B-j receives the optical frequency division multiplexed signal from an optical transmission line 2-j-1, cross-phase-modulates the carrier light beam of the optical frequency division multiplexed signal with the signal light beam, and transmits the optical frequency division multiplexed signal to the optical transmission line 2-j. Moreover, the all-optical modulator 1B-n receives the optical frequency division multiplexed signal from an optical transmission line 2-n-1, cross-phase-modulates the carrier light beam of the optical frequency division multiplexed signal with the signal light beam, and transmits the optical frequency division multiplexed signal to the optical transmission line 2-n.

Figure 13:
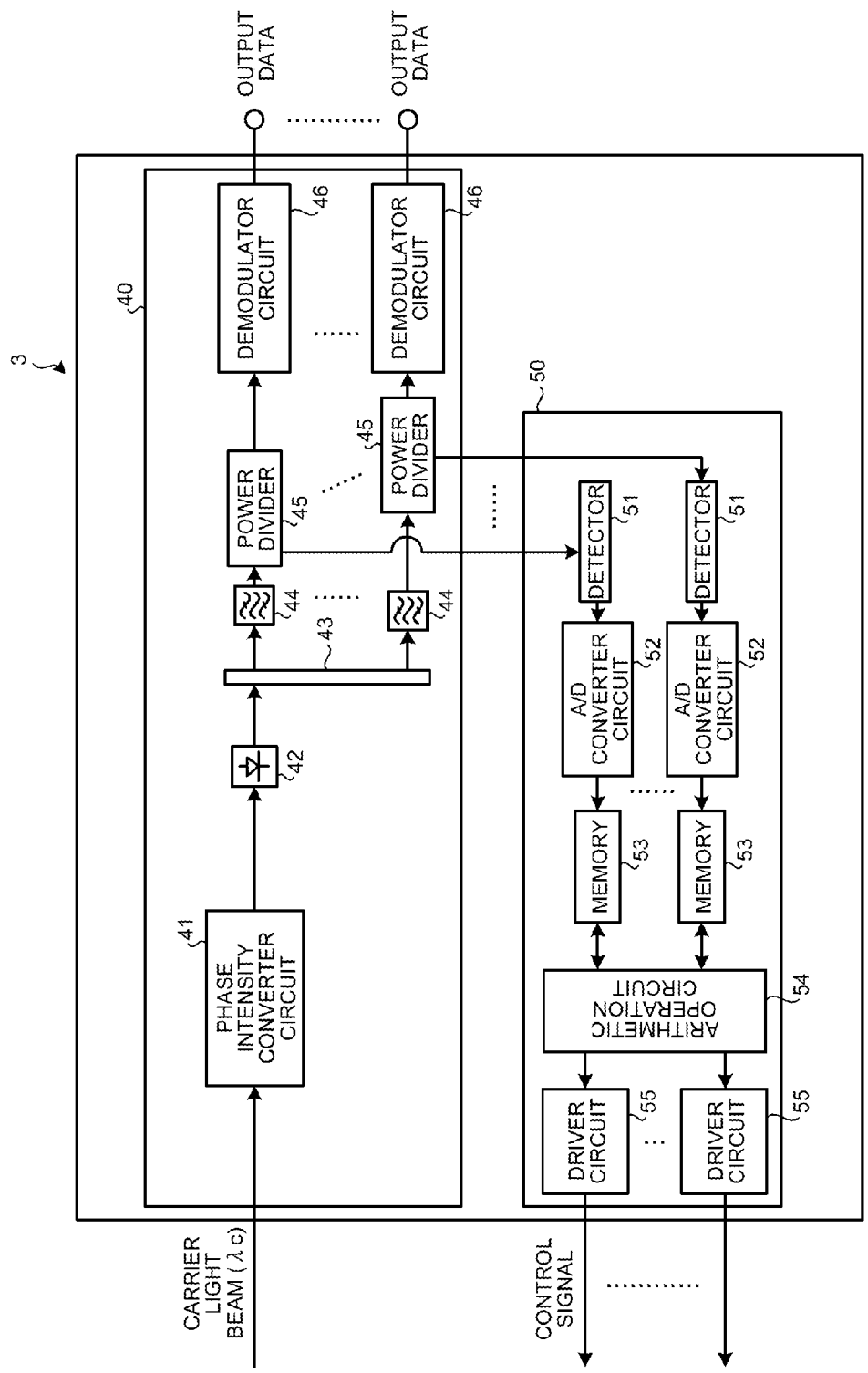
FIG. 13 is an illustration of an exemplary receiving device.

Furthermore, the receiving device 3 receives the optical frequency division multiplexed signal from the optical transmission line 2-n. The receiving device 3 includes a receiver 40 and a monitoring control unit 50. FIG. 13 is an illustration of an exemplary receiving device 3. The receiver 40 illustrated in FIG. 13 includes a phase intensity converter circuit 41, a photodetector 42, a power divider 43, a plurality of RF filters 44, a plurality of power dividers 45, and a demodulator circuit 46. It is noted that the RF filters 44 and the power dividers 45 are individually provided for the characteristic frequencies of carrier signals multiplexed in the optical frequency division multiplexed signal.

The phase intensity converter circuit 41 converts the phase modulation signal of the optical frequency division multiplexed signal into an intensity modulated signal. The photodetector 42 optoelectrically converts the intensity modulated signal that is an optical signal. The power divider 43 that branches the optical frequency division multiplexed signal for the channels of the characteristic frequencies of modulation components multiplexed in the optical frequency division multiplexed signal, and outputs the signals to the RF filters 44. It is noted that the power divider 43 may use amplifiers corresponding to the number of branches because the power divider 43 branches the optical frequency division multiplexed signal for the channels of characteristic frequencies.

The RF filters 44 individually extract a modulation component at a desired characteristic frequency multiplexed in the optical frequency division multiplexed signal. The power dividers 45 branch the extracted modulation component at the characteristic frequency, and output the modulation component to the demodulator circuits 46 and the monitoring control unit 50. The demodulator circuits 46 demodulate the modulation component at the characteristic frequency into an information signal, and output data. It is noted that for the demodulator circuit 46, the following may be used such as an envelope detector, a square-law detector, a synchronous detector, a phase detector, and a frequency detector, for example.

The monitoring control unit 50 includes a plurality of detectors 51, a plurality of A/D converter circuits 52, a plurality of memories 53, an arithmetic operation circuit 54, and a plurality of driver circuits 55. The detectors 51, the A/D converter circuits 52, the memories 53 and the driver circuits 55 are individually provided for the characteristic frequencies of carrier signals multiplexed in the optical frequency division multiplexed signal. It is noted that a single arithmetic operation circuit 54 is provided. However, the arithmetic operation circuit 54 may be individually provided for characteristic frequencies.

The detectors 51 detect a modulation component at a desired characteristic frequency divided at the power dividers 45 in the receiver 40, and output a voltage signal. The A/D converter circuits 52 digitally convert the voltage signal of the modulation component, and stores the voltage signal as the intensity of the modulation component in the memories 53.

The arithmetic operation circuit 54 compares the history of the intensity of the modulation component stored in the memories 53, determines whether the intensity of the modulation component at a characteristic frequency is reduced beyond a predetermined threshold from the maximum value for the individual modulation components at characteristic frequencies, and outputs the determined results of the individual modulation components at the characteristic frequencies to the driver circuits 55. It is noted that the arithmetic operation circuit 54 determines whether the intensity of the modulation component is reduced beyond a predetermined threshold of 1.8 dB, for example.

In the case where the intensity of the modulation component at a characteristic frequency is reduced beyond a predetermined threshold, the driver circuit 55 outputs, to the polarization control unit 19B, a control signal to control the polarization state of the signal light beam that the carrier signal at the characteristic frequency is modulated according to the determined result of the modulation component at the characteristic frequency. The polarization control unit 19B in the all-optical modulator 1B converts the polarization state of the signal light beam at an angle of 90 degrees in response to the control signal.

As a result, the monitoring control unit 50 in the receiving device 3 monitors the intensities of the modulation components at the characteristic frequencies subjected to cross phase modulation at the all-optical modulators 1B-1 to 1B-n. In the case where the intensity of the modulation component at a characteristic frequency is reduced beyond 1.8 dB from the maximum value, the monitoring control unit 50 outputs a control signal to the polarization control unit 19B that controls the polarization state of the signal light beam in such a way that the polarization state of the signal light beam involved in the modulation component at the characteristic frequency is converted at an angle of 90 degrees. Namely, the monitoring control unit 50 in the receiving device 3 collectively monitors the intensities of the modulation components at characteristic frequencies in the optical frequency division multiplexed signals modulated at the all-optical modulators 1B-1 to 1B-n in the optical network 30, and controls the polarization control unit 19B on the individual all-optical modulators based on the monitored results.

The monitoring control unit 50 in the receiving device 3 according to the third embodiment monitors the intensities of the modulation components at characteristic frequencies subjected to cross phase modulation at the all-optical modulators 1B-1 to 1n. In the case where the intensity of the modulation component at a characteristic frequency is reduced beyond 1.8 dB from the maximum value, the monitoring control unit 50 outputs a control signal to the polarization control unit 19B that controls the polarization state of the signal light beam in such a way that the polarization state of the signal light beam involved in the modulation component at the characteristic frequency is converted at an angle of 90 degrees. As a result, it is unnecessary for the all-optical modulators to contain the monitoring control unit and to include the optical coupler to branch a part of the optical frequency division multiplexed signal, so that the number of parts of the overall optical network 30 can be greatly reduced as well as the optical insertion loss of the optical frequency division multiplexed signal can be reduced. Moreover, a reduction in the intensity of the modulation component caused by the polarization dependence of XPM can be suppressed.

It is noted that the monitoring control unit 50 in the receiving device 3 converts the polarization state of the signal light beam at an angle of 90 degrees, in the case where the intensity of the modulation component of the optical frequency division multiplexed signal is reduced beyond 1.8 dB from the maximum value. However, the threshold at which the polarized light is rotated is not limited to a point in time at which the intensity exceeds 1.8 dB from the maximum value. Such a configuration may be possible in which the threshold is set to a given point in time in the range in which the intensity is reduced by 4.8 dB beyond 1.8 dB from the maximum value and the polarization state of the signal light beam is converted at an angle of 90 degrees.

Moreover, the monitoring control unit 15A of the all-optical modulator 1A according to the second embodiment cross-phase-modulates the carrier light beam with the signal light beam at the nonlinear medium 12A, optically branches a part of the optical frequency division multiplexed signal to monitor the modulation component at a characteristic frequency, and controls the polarization state of the signal light beam based on the monitored result. However, such a configuration may be possible in which a polarization monitor that monitors the polarization state of the carrier light beam and the polarization state of the signal light beam is used prior to the cross phase modulation of the carrier light beam and the signal light beam at the nonlinear medium 12A. In the following, an embodiment in this case will be described as a fourth embodiment.

[d] Fourth Embodiment

Figure 14:
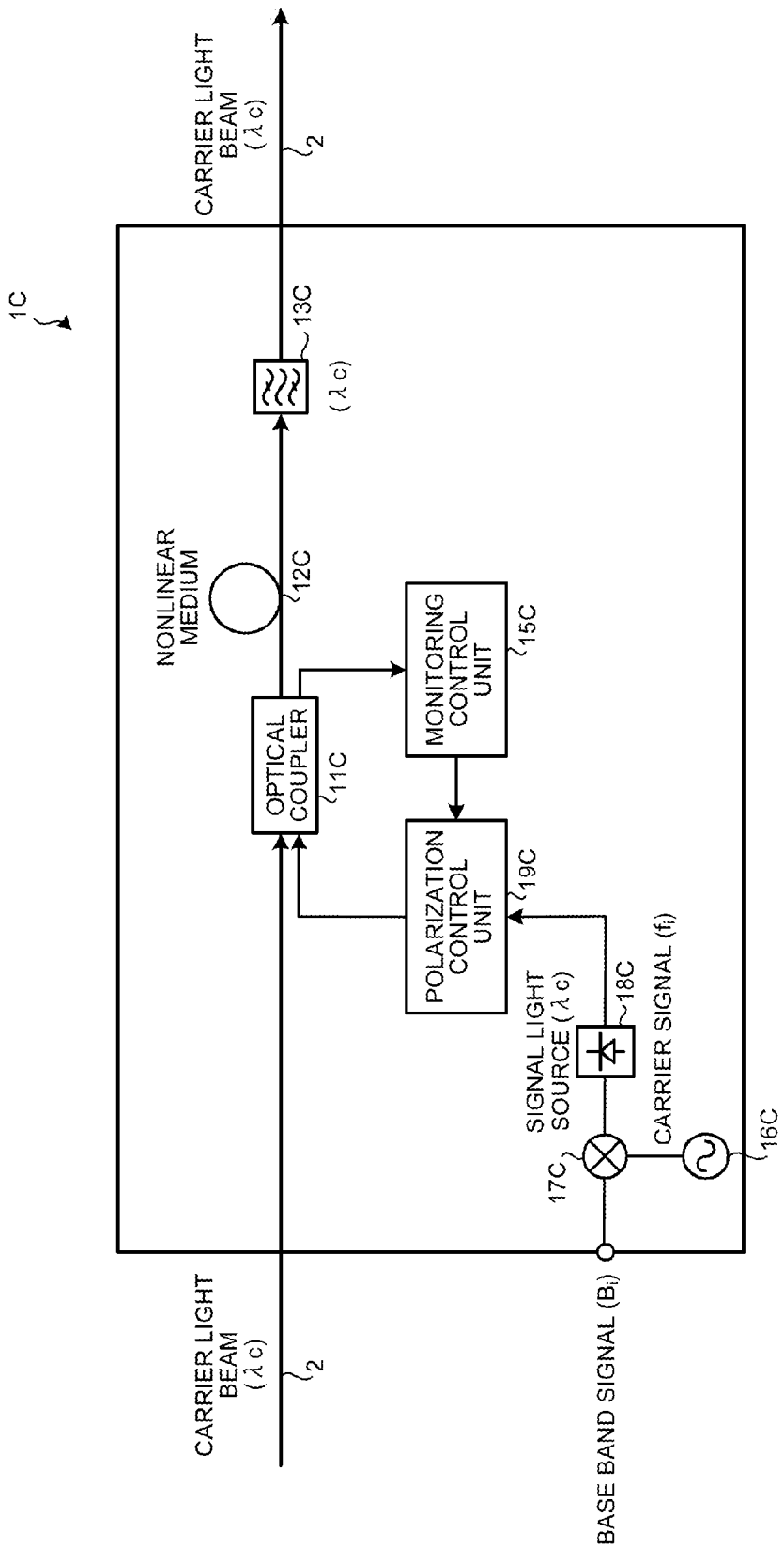
FIG. 14 is an illustration of an exemplary all-optical modulator according to a fourth embodiment.

FIG. 14 is an illustration of an exemplary all-optical modulator 1C according to a fourth embodiment. The all-optical modulator 1C illustrated in FIG. 14 includes an optical coupler 11C, a nonlinear medium 12C, an optical filter 13C, a monitoring control unit 15C, an oscillator 16C, a mixer 17C, a signal light source 18C, and a polarization control unit 19C.

The oscillator 16C oscillates and outputs a carrier signal $f_i$ at an RF frequency, for example, which is a characteristic frequency. When the mixer 17C receives a carrier signal $f_i$ from the oscillator 16C and a base band signal $B_i$, the mixer 17C modulates the carrier signal $f_i$ with the base band signal $B_i$ to generate a subcarrier modulation signal. Moreover, the mixer 17C outputs the generated subcarrier modulation signal to the signal light source 18C. The signal light source 18C outputs a signal light beam at a center wavelength $\lambda s$ whose subcarrier is modulated. The polarization control unit 19C controls the polarization state of the signal light beam $\lambda s$ according to a control signal from the monitoring control unit 15C.

Moreover, the optical coupler 11C multiplexes a carrier light beam $\lambda c$ on the signal light beam $\lambda s$ transmitted from the optical transmission line 2. The nonlinear medium 12C corresponds to a high nonlinear fiber, for example. The nonlinear medium 12C cross-phase-modulates the carrier light beam $\lambda c$ with the signal light beam $\lambda s$, frequency-multiplexes information in the signal light beam $\lambda s$ on the carrier light beam $\lambda c$, and generates and outputs an optical frequency division multiplexed signal.

The optical filter 13C extracts the carrier light beam $\lambda c$ and the optical frequency division multiplexed signal outputted from the nonlinear medium 12C. The monitoring control unit 15C optically branches a part of the carrier light beam and a part of the signal light beam at the optical coupler 11C, and monitors the polarization state of the carrier light beam and the polarization state of the signal light beam, which are optically branched. It is noted that it is unnecessary to use a two-input-two-output optical coupler for the optical coupler 11C. Such a configuration may be possible in which a carrier light beam and a signal light beam are multiplexed with each other at a low transmission loss using a WDM coupler or the like and then a part of power is branched using a power branching optical coupler. Moreover, the monitoring control unit 15C controls the polarization control unit 19C to control the polarization state of the signal light beam based on the monitored result.

Figure 15:
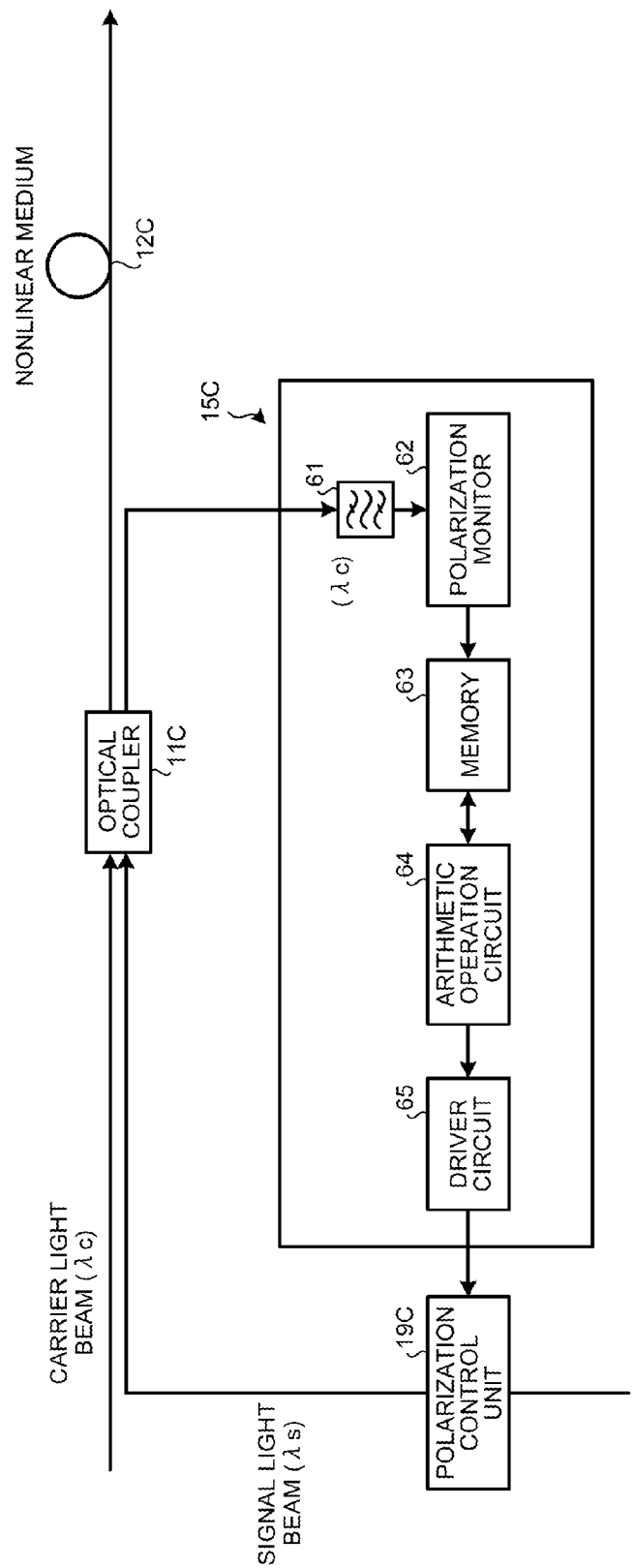
FIG. 15 is an illustration of an exemplary monitoring control unit.

FIG. 15 is an illustration of an exemplary monitoring control unit 15C. The monitoring control unit 15C illustrated in FIG. 15 includes an optical filter 61, a polarization monitor 62, a memory 63, an arithmetic operation circuit 64, and a driver circuit 65. The optical filter 61 extracts a carrier light beam or a signal light beam. The polarization monitor 62 corresponds to a polarimeter, for example, and monitors the polarization state of the extracted carrier light beam or the extracted signal light beam. The polarization monitor 62 temporarily blocks the input of the carrier light beam, and records the polarization state of the signal light beam in the state in which the transmission band of the optical filter 61 is matched with the signal light beam λs, in order to monitor the polarization state of the carrier light beam or the polarization state of the signal light beam using a single polarimeter. In the blocking and recording, since the signal light beam does not propagate through the transmission line, the polarization state can be maintained at constant by a configuration in which the lengths of fibers between a polarization controller, an optical coupler, and a monitoring control circuit coupler, through which the signal light beam propagates, are shortened as short as possible, or using a polarization maintaining fiber. After that, the polarization monitor 62 monitors the polarization state of the carrier light beam by matching the transmission band of the optical filter 61 with the carrier wavelength λc, and grasps the relative angle between the polarization state of the signal light beam and the polarization state of the carrier light beam on the same Poincare sphere surface.

Moreover, the polarization monitor 62 sections hemispheres at the equator or the longitude line depending on a hemisphere at which position the hemisphere is on the Poincare sphere surface, the hemisphere including a polarization plane rotated at an angle of 90 degrees with respect to the polarization state of the signal light beam. For example, in the case where the polarization state of the signal light beam is a right-handed circularly polarized wave, the polarization monitor 62 sections hemispheres at the equator (see FIGS. 8A and 8B). Furthermore, for example, in the case where the polarization state of the signal light beam is a horizontally linear polarized wave, the polarization monitor 62 sections hemispheres at the longitude line of the polarization state of the signal light beam (see FIGS. 6A and 6B).

Figure 16:
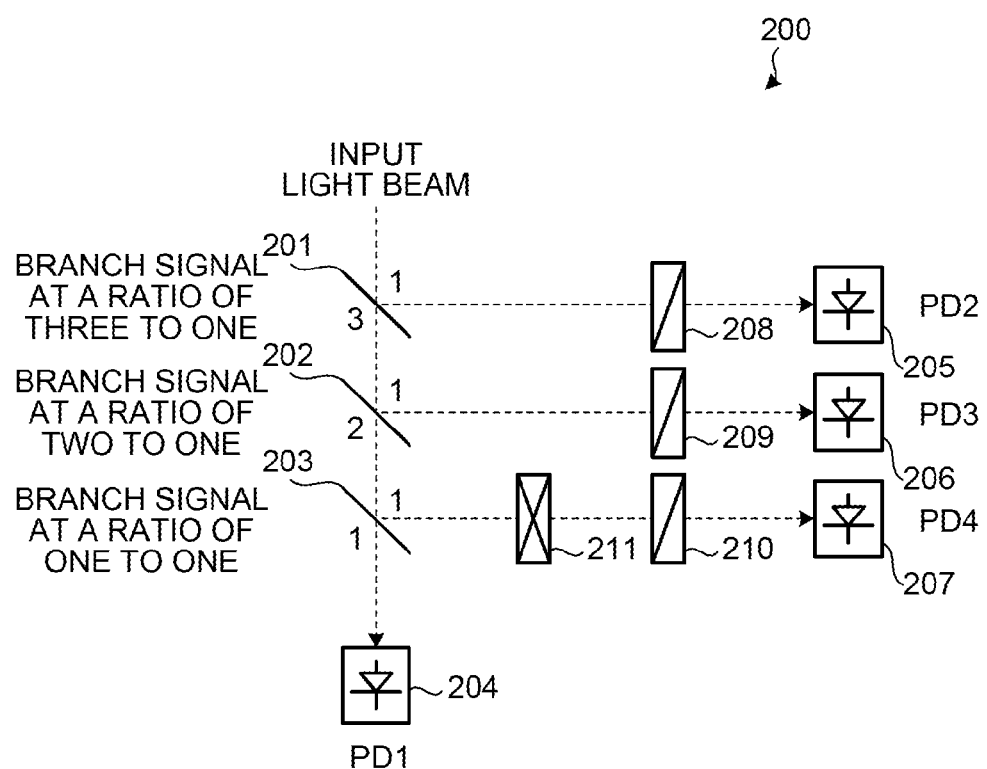
FIG. 16 is an illustration of an exemplary Stokes parameter calculation method used in a polarization monitor.

In addition, the polarization monitor 62 observes the polarization state of the carrier light beam using Stokes parameters, for example, and stores the observed result in the memory 63. FIG. 16 is an illustration of an exemplary measurement circuit in the polarization monitor 62. A measurement circuit 200 illustrated in FIG. 16 is a circuit that measures Stokes parameters. The measurement circuit 200 includes a first optical coupler 201, a second optical coupler 202, a third optical coupler 203, a first PD 204, a second PD 205, a third PD 206, and a fourth PD 207. The measurement circuit 200 further includes a first polarizer 208, a second polarizer 209, a third polarizer 210, and a quarter-wave plate 211.

The first optical coupler 201 optically branches the optical signal at a ratio of three to one, and inputs 25% of the total optical signal to the second PD 205 side. The second optical coupler 202 optically branches the optical signal from the first optical coupler 201 at a ratio of two to one, and inputs 25% of the total optical signal to the third PD 206 side. The third optical coupler 203 optically branches the optical signal from the second optical coupler 202 at a ratio of one to one, and inputs 25% of the total optical signal to the fourth PD 207 side and the first PD 204.

Furthermore, the second PD 205 receives, from the first optical coupler 201, the optical signal transmitted through the first polarizer 208 whose reference plane is at an angle of 0°, and obtains a light intensity PD2. The third PD 206 receives, from the second optical coupler 202, the optical signal transmitted through the second polarizer 209 tilted at an angle of 45° with respect to the reference plane, and obtains a light intensity PD3. The fourth PD 207 receives, from the third optical coupler 203, the optical signal transmitted through the quarter-wave plate 211 and the third polarizer 210 tilted at an angle of 45° with respect to the reference plane, and obtains a light intensity PD4. In addition, the first PD 204 receives the optical signal from the third optical coupler 203, and obtains a light intensity PD1.

Stokes parameters $S_0$, $S_1$, $S_2$ and $S_3$ can be expressed by equations $S_0=PD1$, $S_1=2PD2-PD1$, $S_2=2PD3-PD1$, and $S_3=2PD4-PD1$, for example, using the light intensities P1, P2, P3 and P4. $S_0$ expresses the intensity of inputted light, $S_1$ expresses a horizontally linear polarized component (at an angle of 0 degree), $S_2$ expresses a linear polarized component tilted at an angle of 45 degrees, and $S_3$ expresses a right-handed circularly polarized component. Completely polarized light can be expressed by equation $S_0^2=S_1^2+S_2^2+S_3^2$.

A sphere can be generated as a Poincare sphere. The sphere is positioned at one point on a spherical surface in which the Stokes parameters $S_1$, $S_2$ and $S_3$ of the Stokes parameters ($S_0$, $S_1$, $S_2$, and $S_3$) are set to the axes of a space rectangular coordinate system and the intensity $S_0$ is a radius.

Subsequently, the arithmetic operation circuit 64 calculates a relative angle between the polarization state of the signal light beam and the polarization state of the carrier light beam acquired at the polarization monitor, and determines whether the polarization state of the carrier light beam is on a hemisphere different from a hemisphere on which the polarization state of the signal light beam exists based on the calculated relative angle.

For example, in the case where the polarization state of the signal light beam is a right-handed circularly polarized wave, the arithmetic operation circuit 64 sections hemispheres at the equator as illustrated in FIGS. 8A and 8B, and determines whether the polarization state of the carrier light beam is on a hemisphere different from a hemisphere on which the polarization state of the signal light beam exists. In the case where the polarization state of the carrier light beam is on a hemisphere different from a hemisphere on which the polarization state of the signal light beam exists, the driver circuit 65 outputs a control signal to the polarization control unit 19C to rotate the polarization state of the signal light beam whose relative angle is at an angle of 60 degrees, an angle of 75 degrees, or an angle of 90 degrees, for example, at an angle of 90 degrees. The polarization control unit 19C moves the polarization state of the carrier light beam whose relative angle is at an angle of 60 degrees, an angle of 70 degrees, or an angle of 90 degrees, for example, on the same hemisphere on which the polarization state of the signal light beam exists according to the conversion at an angle of 90 degrees. As a result, the relative angle between the polarization state of the carrier light beam and the polarization state of the signal light beam is within an angle of 45 degrees, so that a reduction in the intensity of the modulation component caused by the polarization dependence of XPM can be greatly reduced.

Moreover, for example, in the case where the polarization state of the signal light beam is a horizontally linear polarized wave, the arithmetic operation circuit 64 sections hemispheres at the longitude line at which the polarization state of the signal light beam is positioned as illustrated in FIGS. 6A and 6B, and determines whether the polarization state of the carrier light beam is on a hemisphere different from a hemisphere on which the polarization state of the signal light beam exists. In the case where the polarization state of the carrier light beam is on a hemisphere different from a hemisphere on which the polarization state of the signal light beam exists, the driver circuit 65 outputs a control signal to the polarization control unit 19C to rotate the polarization state of the signal light beam whose relative angle is at an angle of 60 degrees, an angle of 75 degrees, or an angle of 90 degrees, for example, at an angle of 90 degrees. The polarization control unit 19C moves the polarization state of the carrier light beam whose relative angle is at an angle of 60 degrees, an angle of 70 degrees, or an angle of 90 degrees, for example, on the same hemisphere on which the polarization state of the signal light beam exists according to the conversion at an angle of 90 degrees. As a result, the relative angle between the polarization state of the carrier light beam and the polarization state of the signal light beam is within an angle of 45 degrees, so that a reduction in the intensity of the modulation component caused by the polarization dependence of XPM can be greatly reduced.

It is noted that for the polarization control unit 19C, the following may be used such as a device equipped with a wave plate, a fiber squeezer device (a fiber stress applying device), a liquid crystal device, and a faraday rotator device, for example. For example, a polarization switch (a product name of Pola Switch) commercially available from General Photonics Corporation can rotate the polarization state of the signal light beam at an angle of 90 degrees by applying a voltage of 2 to 3 V.

The all-optical modulator 1C according to the fourth embodiment monitors the polarization state of the carrier light beam and the polarization state of the signal light beam and controls the polarization state of the carrier light beam and the polarization state of the signal light beam in the same hemisphere all the time, so that a reduction in the intensity of the modulation component caused by the polarization dependence of XPM in the nonlinear medium 12C can be reduced.

Moreover, the all-optical modulator 1C has only an insertion loss caused by the optical coupler 11C added to the carrier light beam side as compared with a polarization diversity configuration, so that the insertion loss can be reduced.

It is noted that in the first to fourth embodiments, in the case where the polarization state of the carrier light beam fluctuates on the optical transmission line 2, the polarization state of the signal light beam is controlled. In the following, an embodiment in the case where the polarization state of the signal light beam fluctuates will be described as a fifth embodiment.

[e] Fifth Embodiment

Figure 17:
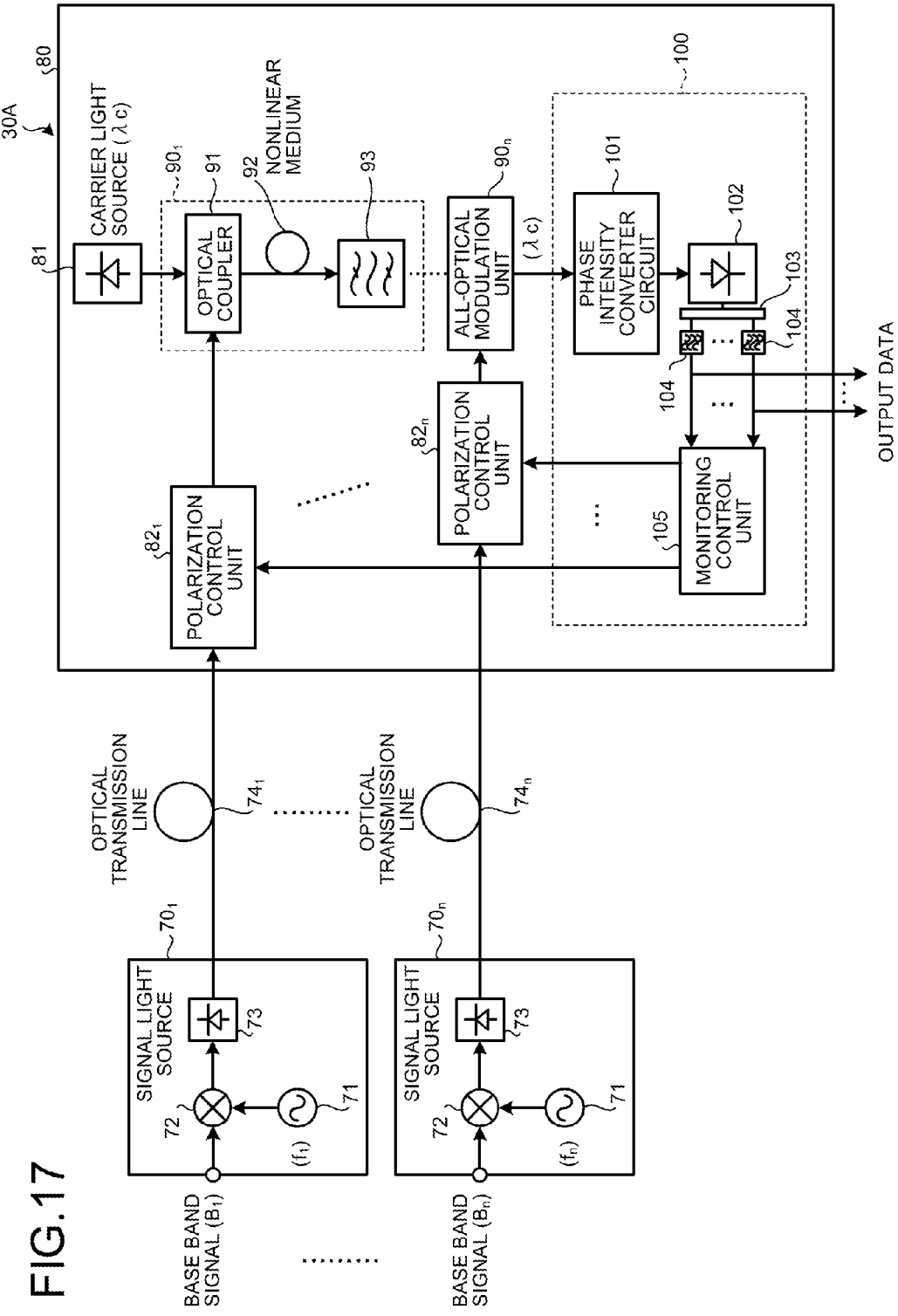
FIG. 17 is an illustration of an exemplary optical network according to a fifth embodiment.

FIG. 17 is an illustration of an exemplary optical network according to a fifth embodiment. An optical network 30A illustrated in FIG. 17 includes a plurality of transmitting devices $70_1$ to $70_n$, a plurality of optical transmission lines $74_1$ to $74_n$, and an optical transmitting device 80. The transmitting devices $70_1$ to $70_n$ include an oscillator 71, a mixer 72, and a signal light source 73.

The oscillator 71 oscillates and outputs a carrier signal f at an RF frequency, for example, which is a characteristic frequency. When the mixer 72 receives the carrier signal f from the oscillator 71 and a base band signal B, the mixer 72 modulates the carrier signal f with the base band signal B to generate a subcarrier modulation signal. Moreover, the mixer 72 outputs the generated subcarrier modulation signal to the signal light source 73. The signal light source 73 outputs a signal light beam whose subcarrier is modulated.

The optical transmitting device 80 is connected to optical transmission lines $74_1$ to $74_n$ that are individually connected to transmitting devices $70_1$ to $70_n$, and receives individual signal light beams from the transmitting devices $70_1$ to $70_n$ through the optical transmission lines $74_1$ to $74_n$. The optical transmitting device 80 includes a carrier light source 81, a plurality of all-optical modulation units $90_1$ to $90_n$, a plurality of polarization control units $82_1$ to $82_n$, and a receiving unit 100. The all-optical modulation units $90_1$ to $90_n$ and the polarization control units $82_1$ to $82_n$ are individually disposed on the optical transmission lines $74_1$ to $74_n$ involved in the transmitting devices $70_1$ to $70_n$.

The carrier light source 81 outputs a carrier light beam at a wavelength λc. The all-optical modulation units $90_1$ to $90_n$ include an optical coupler 91, a nonlinear medium 92, and an optical filter 93. The optical coupler 91 multiplexes the carrier light beam λc transmitted from the carrier light source 81 with a signal light beam. The nonlinear medium 92 corresponds to a high nonlinear fiber, for example. The nonlinear medium 92 cross-phase-modulates the carrier light beam λc with the signal light beam, frequency-multiplexes information in the signal light beam on the carrier light beam λc, and generates and outputs an optical frequency division multiplexed signal. The optical filter 93 extracts the carrier light beam λc and the optical frequency division multiplexed signal outputted from the nonlinear medium 92.

The all-optical modulation units $90_1$ to $90_n$ cross-phase-modulate the carrier light beam with the signal light beams, and output the carrier light beam λc and an optical frequency division multiplexed signal. The all-optical modulation unit 90n then outputs the optical frequency division multiplexed signal to the receiving unit 100. The receiving unit 100 includes a phase intensity converter circuit 101, a photodetector 102, a power divider 103, a plurality of RF filters 104, and a monitoring control unit 105.

The phase intensity converter circuit 101 converts the phase modulation signal of the optical frequency division multiplexed signal from the all-optical modulation unit $90_n$ into an intensity modulated signal. The photodetector 102 optoelectrically converts the intensity modulated signal that is an optical signal. The power divider 103 branches the intensity modulated signal by the number of the transmitting devices 70, and outputs the branched intensity modulated signals to the RF filters 104. The RF filters 104 extract a modulation component at a desired characteristic frequency from the optoelectrically converted intensity modulated signal. The RF filters 104 output data of the extracted modulation component at a characteristic frequency, and output a part of the data to the monitoring control unit 105.

The monitoring control unit 105 detects the extracted modulation component at a desired characteristic frequency for the individual RF filters 104, and detects the intensity of the modulation component. Moreover, the monitoring control unit 105 determines whether the intensity of the modulation component at a characteristic frequency is reduced beyond a predetermined threshold of 1.8 dB, for example, from the maximum value. In the case where the intensity of the modulation component is reduced beyond 1.8 dB, the monitoring control unit 105 outputs, to the polarization control units $82_1$ to $82_n$, a control signal to instruct the polarization state of the signal light beam at a relevant characteristic frequency to be rotated at an angle of 90 degrees.

The polarization control units $82_1$ to $82_n$ control the polarization state of the signal light beam propagating through the optical transmission lines $74_1$ to $74_n$ for the individual transmitting devices $70_1$ to $70_n$ in response to the control signal. In the case where the intensity of the modulation component is reduced beyond 1.8 dB from the maximum value, the polarization state of the signal light beam is rotated at an angle of 90 degrees. As a result, a reduction in the intensity of the modulation component can be suppressed within 1.8 dB from the maximum value.

The optical transmitting device 80 according to the fifth embodiment monitors the intensity of the modulation component of the optical frequency division multiplexed signal, and converts the polarization state of the signal light beam at an angle of 90 degrees, in the case where the intensity of the modulation component is reduced beyond 1.8 dB from the maximum value even though the polarization state of the signal light beam fluctuates. As a result, a reduction in the intensity of the modulation component caused by the polarization dependence of XPM can be reduced.

It is noted that the monitoring control unit 105 according to the fifth embodiment converts the polarization state of the signal light beam at an angle of 90 degrees, in the case where the intensity of the modulation component is reduced beyond 1.8 dB from the maximum value. However, the threshold at which the polarized light is rotated is not limited to a point in time at which the intensity exceeds 1.8 dB from the maximum value. Such a configuration may be possible in which the threshold is set to a given point in time in the range in which the intensity is reduced by 4.8 dB beyond 1.8 dB from the maximum value and the polarization state of the signal light beam is converted at an angle of 90 degrees.

Moreover, for the nonlinear medium 12 (12A, 12B, 12C, and 92) according to the embodiments, an optical waveguide of high refractive index difference may be used such as an optical fiber, a semiconductor optical amplifier, and a thin silicon waveguide, for example. Particularly for the optical fiber, such a fiber and a waveguide may be adopted, including a high nonlinear fiber in which germanium is doped in a core and a core diameter is narrowed to improve a nonlinear coefficient, and in which germanium or bismuth, for example, is doped in a core to improve a nonlinear refractive index. Furthermore, such a fiber and a waveguide may be adopted, in which a mode field is reduced to improve optical power density, a fiber and a waveguide using chalcogenide glass may be adopted, or a fiber and a waveguide of photonic crystals may be adopted.

In addition, for the nonlinear medium 12 (12A, 12B, 12C, and 92) using other devices, a semiconductor optical amplifier in a quantum well structure, a quantum dot semiconductor optical amplifier, a silicon photonics waveguide or the like may be used. Moreover, for the other nonlinear medium, such a device may be used that the secondary nonlinear optical effect is generated such as a three-wave mixing device. In this case, such a device may be used including a $LiNbO_3$ waveguide having a quasi phase matching structure, a GaAlAs device, and a secondary nonlinear optical crystal, for example. It is noted that even in the case where a secondary nonlinear optical medium is used, such a configuration is preferable in which phase matching wavelength disposition is provided.

Moreover, the subcarrier modulation signal and the subcarrier modulation signal light beam are also applicable to an amplitude modulation signal, a phase modulation signal, a frequency modulation signal, a multilevel modulation signal, a frequency division multiplexed signal, an orthogonal frequency division multiplexed (OFDM) signal, or a quadrature amplitude modulation (QAM) signal, for example.

Furthermore, the components of the units illustrated in the drawings are not necessarily physically configured as in the drawings. Namely, the specific forms of the distribution and integration of the components are not limited to ones illustrated in the drawings. All or a part of the components can be configured as functionally or physically distributed or integrated in given units according to various loads, the use situations, or the like.

In the disclosed mode, the polarization dependence of an all-optical modulator using cross phase modulation can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical frequency division multiplexer comprising:
    a nonlinear medium that multiplexes, on a carrier light beam, a signal light beam of a modulation signal that a carrier signal at a characteristic frequency is modulated with an information signal, cross-phase-modulates the carrier light beam with the signal light beam, frequency-multiplexes the information signal in the signal light beam on the carrier light beam, generates an optical frequency division multiplexed signal, and outputs the optical frequency division multiplexed signal; and
    a control unit that controls a polarization state of the signal light beam in a direction in which an intensity of a modulation component takes a maximum value, based on the intensity of the modulation component involved in a modulation signal at a desired characteristic frequency of the optical frequency division multiplexed signal when the intensity of the modulation component involved in the modulation signal at the desired characteristic frequency of the optical frequency division multiplexed signal is reduced beyond a predetermined threshold from a maximum value, wherein the control unit includes:
    an intensity converting unit that converts a part of the optical frequency division multiplexed signal into an intensity modulated signal;
    an optoelectric conversion unit that optoelectrically converts the converted intensity modulated signal;
    an extracting unit that extracts the modulation component involved in the modulation signal at the desired characteristic frequency of the optoelectrically converted intensity modulated signal; and
    an intensity detecting unit that detects the intensity of the extracted modulation component.

2. The optical frequency division multiplexer according to claim 1, wherein when the intensity of the modulation component involved in the modulation signal at the desired characteristic frequency of the optical frequency division multiplexed signal is reduced beyond a predetermined threshold of 1.8 dB from a maximum value, the control unit controls the polarization state of the signal light beam.

3. The optical frequency division multiplexer according to claim 1, wherein the control unit converts the polarization state of the signal light beam at an angle of 90 degrees to make a relative angle between the polarization state of the signal light beam and a polarization state of the carrier light beam within an angle of 45 degrees.

4. The optical frequency division multiplexer according to claim 1, wherein:

when the intensity of the modulation component involved in the modulation signal at the desired characteristic frequency of the optical frequency division multiplexed signal is reduced beyond a predetermined threshold from a maximum value, a receiving device that receives the optical frequency division multiplexed signal outputs a control signal; and when the control signal from the receiving device is detected, the control unit controls the polarization state of the signal light beam.

5. The optical frequency division multiplexer according to claim 4, wherein when the modulation component involved in the modulation signal at the desired characteristic frequency is extracted in modulation components involved in modulation signals at a plurality of characteristic frequencies of the optical frequency division multiplexed signal, the optical frequency division multiplexed signal being cross-phase-modulated at optical frequency division multiplexers, and the intensity of the modulation component involved in the extracted modulation signal at the desired characteristic frequency is reduced beyond the predetermined threshold, the receiving device outputs the control signal to the control unit of the optical frequency division multiplexer in which cross phase modulation is performed with a signal light beam involved in the modulation signal at the desired characteristic frequency.

6. The optical frequency division multiplexer according to claim 5, wherein the receiving device includes:
    an intensity converting unit that converts a part of the optical frequency division multiplexed signal into an intensity modulated signal;
    an optoelectric conversion unit that optoelectrically converts the converted intensity modulated signal;
    a first extracting unit that extracts the modulation component involved in modulation signals at characteristic frequencies of optoelectrically converted intensity modulated signals;
    a second extracting unit that extracts the modulation component involved in the modulation signal at the desired characteristic frequency in a plurality of the extracted modulation components; and
    a detecting unit that detects the intensity of the extracted modulation component.

7. The optical frequency division multiplexer according to claim 4, wherein the control unit converts the polarization state of the signal light beam at an angle of 90 degrees to make a relative angle between the polarization state of the signal light beam and a polarization state of the carrier light beam within an angle of 45 degrees.

8. A polarization control method for an optical frequency division multiplexer, the method causing the optical frequency division multiplexer to execute processes of:
    multiplexing, on a carrier light beam, a signal light beam of a modulation signal that a carrier signal at a characteristic frequency is modulated with an information signal, cross-phase-modulating the carrier light beam with the signal light beam through a nonlinear medium, and frequency-multiplexing the information signal in the signal light beam on the carrier light beam to generate an optical frequency division multiplexed signal; and
    controlling a polarization state of the signal light beam in a direction in which an intensity of a modulation component takes a maximum value, based on the intensity of the modulation component involved in a modulation signal at a desired characteristic frequency of the optical frequency division multiplexed signal when the intensity of the modulation component involved in the modulation signal at the desired characteristic frequency of the optical frequency division multiplexed signal is reduced beyond a predetermined threshold from a maximum value, wherein the controlling includes:
    converting a part of the optical frequency division multiplexed signal into an intensity modulated signal;
    converting the converted intensity modulated signal optoelectrically;
    extracting the modulation component involved in the modulation signal at the desired characteristic frequency of the converted intensity modulated signal optoelectrically; and
    detecting the intensity of the extracted modulation component.

* * * * *